United States Patent
Han et al.

(10) Patent No.: US 9,730,114 B2
(45) Date of Patent: Aug. 8, 2017

(54) GENERATION OF RANDOM ACCESS PREAMBLES

(71) Applicant: Intel IP Corporation, Santa Clara, CA (US)

(72) Inventors: Seunghee Han, Cupertino, CA (US); Gang Xiong, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/317,450

(22) Filed: Jun. 27, 2014

(65) Prior Publication Data

US 2015/0078264 A1 Mar. 19, 2015

Related U.S. Application Data

(60) Provisional application No. 61/879,014, filed on Sep. 17, 2013, provisional application No. 61/898,425, filed on Oct. 31, 2013.

(51) Int. Cl.
*H04W 36/00* (2009.01)
*H04W 74/08* (2009.01)
(Continued)

(52) U.S. Cl.
CPC ......... *H04W 36/0016* (2013.01); *H04L 65/60* (2013.01); *H04N 7/147* (2013.01); *H04W 36/0055* (2013.01); *H04W 74/0833* (2013.01); *G06Q 30/0251* (2013.01); *G06Q 30/0269* (2013.01)

(58) Field of Classification Search
CPC ............. H04W 74/008; H04W 74/0833; H04J 13/0062; H04J 13/14; H04J 13/22
See application file for complete search history.

(56) References Cited

U.S. PATENT DOCUMENTS

| | | | |
|---|---|---|---|
| 2008/0235314 A1* | 9/2008 | Lee ........................ | H04J 13/14 708/426 |
| 2009/0286566 A1* | 11/2009 | Lindholm ............. | H04W 52/10 455/522 |

(Continued)

OTHER PUBLICATIONS

International Search Report and Written Opinion mailed Dec. 12, 2014 for International Application No. PCT/US2014/053461, 17 pages.

(Continued)

*Primary Examiner* — Scott M Sciacca
(74) *Attorney, Agent, or Firm* — Schwabe, Williamson & Wyatt, P.C.

(57) ABSTRACT

Embodiments described herein relate generally to a random procedure between wireless transmit/receive units ("WTRUs") and access nodes. A WTRU may be adapted to determine a repetition level that corresponds to a number of repetitions associated with communication with the access node. The WTRU may then determine at least one of a resource and/or a logical root sequence index associated with the random access procedure. The WTRU may transmit a random access preamble based on the resource and/or a logical root sequence index. The access node may be adapted to determine a repetition level associated with the WTRU based on the random access procedure. Other embodiments may be described and/or claimed.

24 Claims, 15 Drawing Sheets

(51) Int. Cl.
*H04L 29/06* (2006.01)
*H04N 7/14* (2006.01)
*G06Q 30/02* (2012.01)

(56) References Cited

U.S. PATENT DOCUMENTS

| | | | |
|---|---|---|---|
| 2009/0305693 A1* | 12/2009 | Shimomura | H04W 74/004 455/422.1 |
| 2010/0074130 A1* | 3/2010 | Bertrand | H04L 1/0007 370/252 |
| 2011/0158104 A1* | 6/2011 | Frenger | H04W 74/0833 370/241 |
| 2011/0222498 A1 | 9/2011 | Chun et al. | |
| 2011/0292854 A1* | 12/2011 | Terry | H04L 5/001 370/311 |
| 2013/0045706 A1* | 2/2013 | Hsu | H04W 48/02 455/404.1 |
| 2015/0173105 A1* | 6/2015 | Bergstrom | H04W 74/006 370/329 |
| 2015/0373740 A1* | 12/2015 | Eriksson | H04W 74/0833 370/329 |
| 2016/0174256 A1* | 6/2016 | Ratasuk | H04L 43/0829 370/329 |

OTHER PUBLICATIONS

Intel Corporation, "Discussion on PRACH Coverage Enhancement for Low Cost MTC", R1-132930, 3GPP TSG RAN WG1 Meeting #74, Barcelona, Spain, Aug. 19-23, 2013 (http://www.3gpp.org/ftp/tsg_ran/wg1_r11/TSGR1_74/Docs/), see p. 2-5.

Fujitsu, "MTC PRACH Limitations", R1-133773, 3GPP TSG-RAN WG1 Meeting #74, Barcelona, Spain, Aug. 19-23, 2013 (http://www.3gpp.org/ftp/tsg_ran/wg1_r11/TSGR1_74/Docs/), see p. 3.

Alcatel-Lucent et al., "Coverage enhancement for PRACH", R1-132971, 3GPP TSG-RAN WG1 Meeting #74, Barcelona, Spain, Aug. 19-23, 2013 (http://www.3gpp.org/ftp/tsg_ran/wg1_r11/TSGR1_74/Docs/), see p. 2.

Extended European Search Report issued Feb. 22, 2017 from European Patent Application No. 14846686.5, 10 pages.

Fujitsu, "PBCH related issues of Low-cost MTC UEs based on LTE," 3GPP TSG RAN WG1 Meeting #72bis, R1-131096, Agenda Item: 7.2.4.2, Apr. 15-19, 2013, Chicago, USA, 4 pages.

\* cited by examiner

GENERATION OF RANDOM ACCESS PREAMBLES

CROSS REFERENCE TO RELATED APPLICATIONS

This application claims priority under 35 U.S.C. §119(e) to U.S. Provisional Patent Application No. 61/898,425 entitled "ADVANCED WIRELESS COMMUNICATION SYSTEMS AND TECHNIQUES," filed Oct. 31, 2013, and U.S. Provisional Patent Application No. 61/879,014 entitled "ADVANCED WIRELESS COMMUNICATION SYSTEMS AND TECHNIQUES," filed Sep. 17, 2013, the disclosures of which are incorporated herein by reference.

FIELD

Embodiments of the present invention relate generally to the technical field of data processing, and more particularly, to computer devices operable to communicate data over a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

To synchronize with a cell in a network, a user equipment ("UE") may perform a random access procedure. A random access procedure may be performed where, for example, a UE attempts to access a network in a Radio Resource Control ("RRC") idle state, a UE performs an RRC connection re-establishment procedure, a UE is handed over to a target cell, a UE requires allocated resources on a physical uplink control channel ("PUCCH") for a Scheduling Request ("SR"), and so forth. A UE may begin a random access procedure by transmitting a random access preamble to an access node. In response, the access node may transmit a random access response that includes data allowing the UE to communicate with the access node in the uplink direction.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
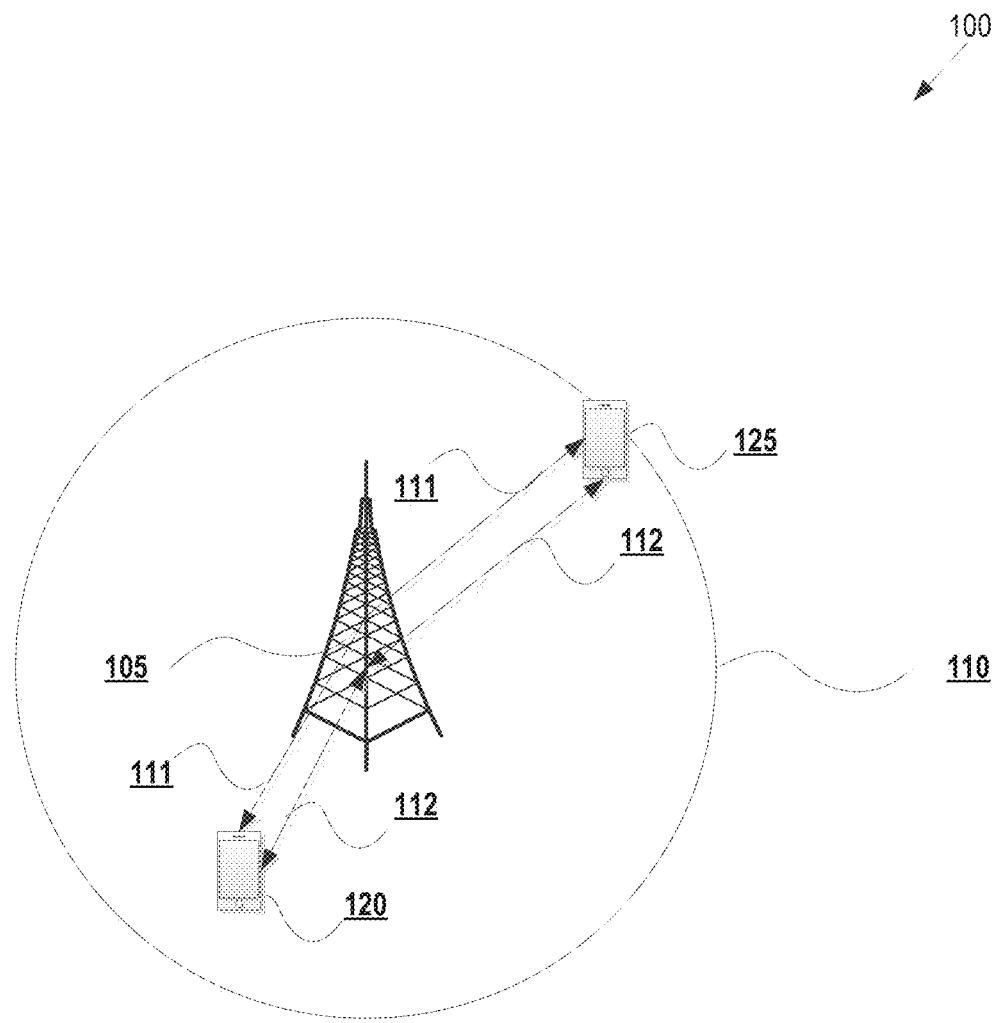
FIG. 1 is a block diagram illustrating an environment in which an access node may receive differentiable random access preambles from respective wireless transmit/receive units ("WTRUs"), in accordance with various embodiments.

Beginning first with FIG. 1, a block diagram shows an environment 100 in which an access node 105 may receive differentiable random access preambles from respective WTRUs 120, 125, in accordance with various embodiments. The WTRUs 120, 125 may be any type of computing device equipped with broadband circuitry and adapted to operate on a cell (e.g., the cell 110) according to, for example, one or more 3$^{rd}$ Generation Partnership Project ("3GPP") technical specifications. In an embodiment, at least one of the WTRUs 120, 125 may be a UE, such as a netbook, a tablet computer, a handheld computing device, a web-enabled appliance, a gaming device, a mobile phone, a smartphone, an eBook reader, a personal data assistant, or the like. In another embodiment, at least one of the WTRUs 120, 125 may be a computing device that is not primarily adapted for user communications (e.g., voice calling, text/instant messaging, web browsing), such as a smart metering device, payment device (e.g., a "pay-as-you-drive" device), a vending machine, a telematics system (e.g., a system adapted for tracking and tracing of vehicles), a security system (e.g., a surveillance device), and the like.

One or both of the WTRUs 120, 125 may be adapted for machine-type communication ("MTC") according to standards defined by, for example, one or more 3GPP technical specifications. An MTC WTRU may be adapted to communicate with another computing device without user interaction—e.g., the WTRU 125 may communicate data to the access node 105 without being prompted to do so by a user. In some embodiments, this MTC may facilitate the "Internet of Things." While in one embodiment, the WTRU 125 may be adapted for MTC, the other WTRU 120 may or may not be, for example, a legacy device.

According to embodiments, the UEs 110, 115 may be configured for intersystem communication by operating on a wireless cell 110. The cell 110 may be provided by the access node 105, which may be a node B, such as an evolved Node B, a low-power radio access node adapted to provide a small cell, or essentially any other node adapted to provide the wireless cell 110. The access node 105 may connect the WTRUs 120, 125 to a core network as part of, for example, a third Generation ("3G"), fourth Generation ("4G"), fifth Generation ("5G"), or beyond system that adheres to one or more standards, such as Long Term Evolution ("LTE"), LTE-Advanced ("LTE-A"), or other similar standard.

In order to operate on the wireless cell 110, the WTRUs 120, 125 may need to synchronize with the access node 105. The access node 105 may transmit (e.g., broadcast) system information that may be received by the WTRUs 120, 125. The access node 105 may transmit the system information as one or more system information blocks ("SIBs") over a broadcast control channel ("BCCH"). The WTRUs 120, 125 may determine one or more values from the system information and perform a random access procedure with the access node 105 using, for example, a physical random access channel ("PRACH") 112. The WTRUs 120, 125 may transmit a random access preamble using the PRACH 112. Based on the random access preamble, the access node 105 may transmit a random access response, for example, to allocate respective uplink resources to the WTRUs 120, 125.

According to embodiments, a WTRU 125 may have limited coverage by the cell 110, such as where the WTRU 125 is near the edge of the cell 110. The coverage-limited WTRU 125 may benefit from multiple repetitions of the random access preamble, the random access response, and/or additional data for communication with the access node 105. In embodiments, the coverage-limited WTRU 125 may have difficulty demodulating, de-multiplexing, and/or descrambling a downlink channel or signal and, therefore, data may be repeated in one or more channels or signals—e.g., data may be repeated in a plurality of subframes in one or both downlink or uplink communications with the access node 105. In other words, the coverage-limited WTRU 125 may be associated with a repetition level that is greater than one (e.g., two, four, eight, sixteen), whereas a non-coverage-limited WTRU 120 may be associated with a repetition level of one (e.g., only one transmission may be considered sufficient for communication of data between the access node 105 and the non-coverage-limited WTRU 120).

One or both of the WTRUs 120, 125 may be adapted to determine its respective repetition level. For example, one of the WTRUs 120, 125 may determine its repetition level based on an estimation of path loss such that a higher estimated path loss corresponds to a higher repetition level (e.g., an estimated path loss above a threshold amount indicates a repetition level greater than one). In various embodiments, the coverage-limited WTRU 125 may determine that it is associated with a repetition level greater than one and, therefore, may indicate this increased repetition level to the access node 105. Based on the indicated repetition level associated with the coverage-limited WTRU 125, the access node 105 may coordinate uplink and/or downlink operations associated with the WTRU 125, such as by repeating data in multiple subframes of downlink transmissions and/or monitoring multiple subframes of uplink transmissions from the WTRU 125 for data.

In various embodiments, the random access procedure between the access node 105 and the coverage-limited WTRU 125 may be adapted to indicate a repetition level greater than one. To effect this mechanism, the random access procedure between the access node 105 and the WTRUs 120, 125 may differ for the non-coverage-limited WTRU 120 and the coverage-limited WTRU 125. According to one embodiment, the coverage-limited WTRU 125 may transmit a random access preamble over the PRACH 112 using one or more resources that are different than the one or more resources to be used by the non-coverage-limited WTRU 120. For example, the WTRU 125 may use different time, frequency, and/or code resources in transmission of the random access preamble to the access node 105 so that the access node 105 may detect that the WTRU 125 has limited coverage based on the time, frequency, and/or code resource in which the random access preamble appears in the PRACH 112. According to another embodiment, the coverage-limited WTRU 125 may determine a random access preamble based on its repetition level. In various embodiments, the access node 105 may indicate, in a SIB, a resource and/or a logical root sequence index to be used for determination of the random access preamble. The access node may broadcast one or more SIBs using a broadcast channel ("BCCH") 111. For example, the access node 105 may broadcast one or more SIBs that include two indications of resources to be used for a random access procedure: an indication of a first resource to be used by legacy WTRUs, non-coverage-limited WTRUs, non-MTC WTRUs and an indication of a second resource to be used by WTRUs with a repetition level greater than one and/or MTC-adapted WTRUs. Similarly, the access node 105 may broadcast one or more SIBs that include two logical root sequence indices to be used for a random access procedure: an indication of a first logical root sequence index to be used by legacy WTRUs, non-coverage-limited WTRUs, non-MTC WTRUs and an indication of a second logical root sequence index to be used by WTRUs with a repetition level greater than one and/or MTC-adapted WTRUs. In one embodiment, a root sequence index, used by the coverage-limited WTRU 125 to determine the random access preamble, may be based on a cubic metric ("CM") value.

Figure 2:
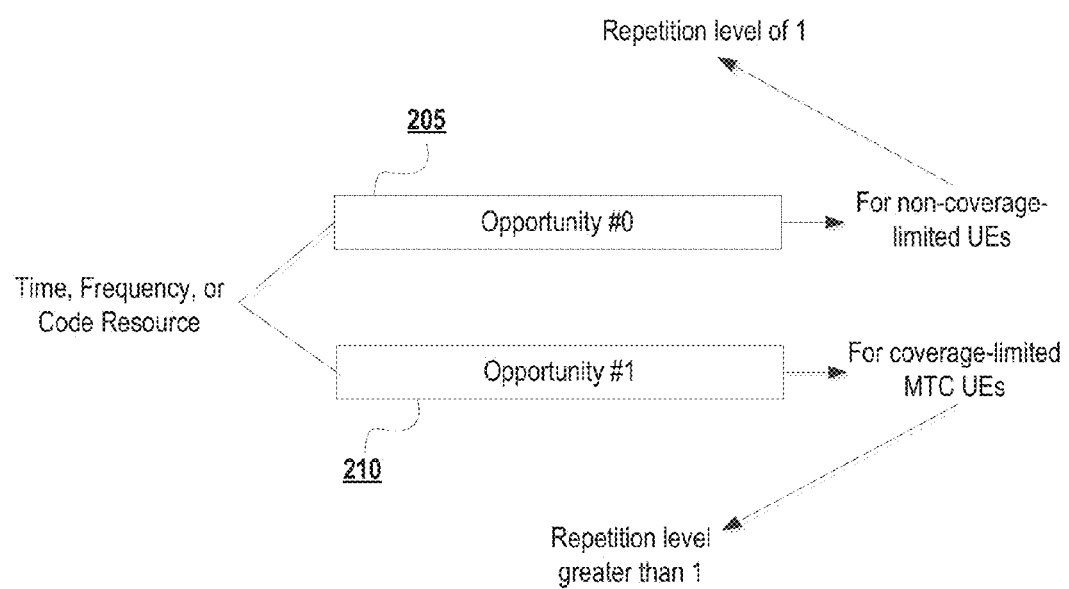
FIG. 2 is a block diagram illustrating a plurality of physical random access channel opportunities that may be utilized by WTRUs during random access procedures, in accordance with various embodiments.

With respect to FIG. 2, a block diagram illustrates a plurality of PRACH opportunities 205, 210 that may be utilized by WTRUs during random access procedures, in accordance with various embodiments. The PRACH opportunities 205, 210 may be utilized by, for example, the WTRUs 120, 125 of FIG. 1 when transmitting random access preambles to the access node 105 using PRACH 112. Correspondingly, an access node may be adapted to receive random access preambles according to both PRACH opportunities 205, 210. The plurality of PRACH opportunities 205, 210 may be used in both contention-based and contention-free random access procedures.

In various embodiments, one of the PRACH opportunities 205, 210 may include at least one of a time resource, a frequency resource, and/or a code resource. A code resource may be at least one of a root sequence index (e.g., a logical root sequence index or a physical root sequence index) or a cyclic shift. In another embodiment, a code resource may be a combination of a root sequence index (e.g., a logical root sequence index or a physical root sequence index) and a cyclic shift.

In order to distinguish between a non-coverage-limited WTRU and a coverage-limited WTRU, an access node may detect a resource associated with one of the PRACH opportunities 205, 210 used by a WTRU for a random access procedure. In response, the access node may coordinate uplink and/or downlink operations associated with communication with a WTRU based on the detected resource associated with one of the PRACH opportunities 205, 210. An access node may indicate the PRACH opportunities 205, 210 to a WTRU in system information, such as one or more SIBs transmitted using a BCCH. For example, a resource associated with the first PRACH opportunity 205 may be indicated in a SIB2.

According to embodiments, a first PRACH opportunity 205 may indicate that a WTRU is associated with a repetition level of one (e.g., only one transmission may be considered sufficient for communication of data between the WTRU and an access node). For example, a legacy WTRU (e.g., a WTRU that does not support increased repetition levels), a WTRU that is not adapted for MTC communication, and/or a WTRU that determines its associated repetition level to be one may transmit a random access preamble to an access node using the first PRACH opportunity 205. An access node that receives a random access preamble from a WTRU using the first PRACH opportunity 205 may determine that the WTRU is associated with a repetition level of one and, therefore, may only transmit data to that WTRU once (e.g., the access node may not repeatedly transmit data without receiving an indication or request for retransmission).

However, a second PRACH opportunity 210 may indicate that a WTRU is associated with a repetition level greater than one (e.g., multiple transmissions may improve communication of data between the WTRU and an access node). For example, a coverage-limited MTC WTRU may determine an associated repetition level greater than one and may transmit a random access preamble to an access node using the second PRACH opportunity 210. An access node that receives a random access preamble from a WTRU using the second PRACH opportunity 210 may determine that the coverage-limited MTC WTRU is associated with a repetition level greater than one and, therefore, may repeatedly transmit data to that WTRU (e.g., the access node may include data in multiple subframes).

In various embodiments, a WTRU that determines its repetition level to be greater than one may identify an indication of the second PRACH opportunity 210 to be used from a SIB transmitted by an access node. While that or another SIB may also include an indication of the first PRACH opportunity 205, a coverage-limited WTRU may be adapted to select the second PRACH opportunity 210 for transmission of a random access preamble based on the determination that the WTRU has limited coverage. In other embodiments, additional PRACH opportunities (not shown) may be used by a WTRU to indicate a specific repetition level to an access node (e.g., the second PRACH opportunity 210 may be used to indicate a repetition level of two, a third PRACH opportunity may be used to indicate a repetition level of four, a fourth PRACH opportunity may be used to indicate a repetition level of eight, and so forth). Additional information associated with the PRACH opportunities 205, 210 may be indicated in one or more SIBs (e.g., SIB-17), and the coverage-limited WTRU may be adapted to transmit a random access preamble according to the additional information.

Figure 3:
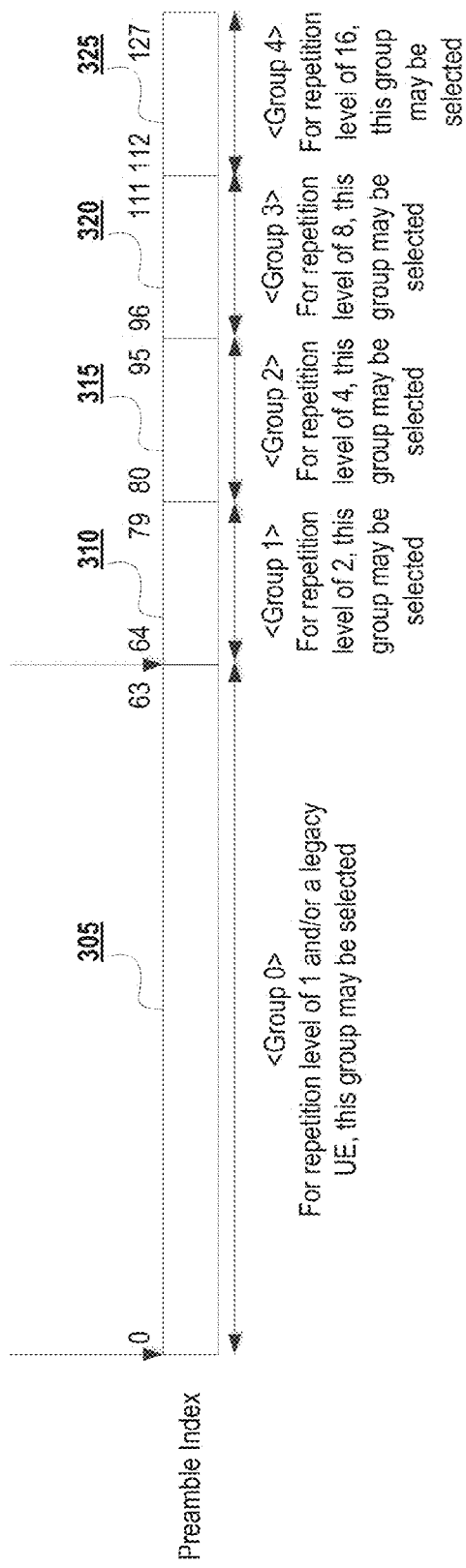
FIG. 3 is a block diagram illustrating a plurality of groups of random access preambles that a WTRU may transmit to an access node to indicate a repetition level associated with the WTRU, in accordance with various embodiments.

Turning to FIG. 3, a block diagram illustrates a plurality of groups 305-325 of random access preambles that a WTRU may transmit to an access node to indicate a repetition level associated with the WTRU, in accordance with various embodiments. A random access preamble from one of the groups 305-325 may be utilized by, for example, the WTRUs 120, 125 of FIG. 1 when transmitting random access preambles to the access node 105 using PRACH 112. Correspondingly, an access node may be adapted to receive random access preambles from the groups 305-325. The random access preambles from the groups 305-325 may be used in both contention-based and contention-free random access procedures.

In a cell provided by an access node, at least sixty-four random access preambles may be available to WTRUs, and these random access preambles may be generated by application of cyclic shifts to a Zadoff-Chu ("ZC") sequence. An access node may indicate a value to determine a logical root sequence index to a WTRU in a SIB, and the WTRU may determine a corresponding physical root sequence index u associated with the ZC sequence from which the at least sixty-four random access preambles are to be generated—e.g., the WTRU may access a lookup table to determine a physical root sequence index u that corresponds to a logical root sequence index indicated by the access node in a SIB. The first sixty-four random access preambles may be considered a first group 305 that is to be used by, for example, a legacy WTRU (e.g., a WTRU that is not adapted to determine a repetition level), a WTRU that is not adapted for MTC, and/or a WTRU that determines its repetition level to be one.

Correspondingly, an access node that receives and processes a random access preamble from the first group 305 may determine that the transmitting WTRU is associated with a repetition level of one.

In embodiments of a preamble format three, the length of a ZC sequence, indicated as "$N_{zc}$," may be 839, and there may be 838 logical root sequence indices available. In embodiments of a preamble format four, the length of the ZC sequence $N_{zc}$ may be 139, and there may be 138 logical root sequence indices available. As indicated above, the logical root sequence index, which may be signaled to WTRU in a SIB (e.g., as a value corresponding to a "rootSequenceIndex" field in a SIB-2), may correspond to a logical root sequence index to determine a physical root sequence index u that may be used for a ZC sequence based on a PRACH preamble. The random access preambles associated with a cell provided by an access node may be found by including first, in the order of increasing cyclic shift, all the available cyclic shifts of a root ZC sequence with the logical index (which may be indicated as "RACH_ROOT_SEQUENCE" and broadcast by the access node as part of a SIB). Additional preamble sequences, in case all random access preambles cannot be generated from a single root ZC sequence, are obtained from the root sequences with the consecutive logical indexes until all the random access preambles are found. The logical root sequence order is cyclic: the logical index zero is consecutive to 837. The relation between a logical root sequence index and physical root sequence index u is given by the following tables.

| Root ZC sequence order for preamble formats zero through three | |
|---|---|
| Logical root sequence number | Physical root sequence number$^a$ (in increasing order of the corresponding logical sequence number) |
| 0-23 | 129, 710, 140, 699, 120, 719, 210, 629, 168, 671, 84, 755, 105, 734, 93, 746, 70, 769, 60, 779 2, 837, 1, 838 |
| 24-29 | 56, 783, 112, 727, 148, 691 |
| 30-35 | 80, 759, 42, 797, 40, 799 |
| 36-41 | 35, 804, 73, 766, 146, 693 |
| 42-51 | 31, 808, 28, 811, 30, 809, 27, 812, 29, 810 |
| 52-63 | 24, 815, 48, 791, 68, 771, 74, 765, 178, 661, 136, 703 |
| 64-75 | 86, 753, 78, 761, 43, 796, 39, 800, 20, 819, 21, 818 |
| 76-89 | 95, 744, 202, 637, 190, 649, 181, 658, 137, 702, 125, 714, 151, 688 |
| 90-115 | 217, 622, 128, 711, 142, 697, 122, 717, 203, 636, 118, 721, 110, 729, 89, 750, 103, 736, 61, 778, 55, 784, 15, 824, 14, 825 |
| 116-135 | 12, 827, 23, 816, 34, 805, 37, 802, 46, 793, 207, 632, 179, 660, 145, 694, 130, 709, 223, 616 |
| 136-167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168-203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204-263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264-327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328-383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384-455 | 3, 836, 19, 820, 22, 817, 41, 798, 38, 801, 44, 795, 52, 787, 45, 794, 63, 776, 67, 772, 72 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456-513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514-561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562-629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630-659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660-707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708-729 | 346, 493, 339, 500, 351, 488, 306, 533, 289, 550, 400, 439, 378, 461, 374, 465, 415, 424, 270, 569, 241, 598 |
| 730-751 | 231, 608, 260, 579, 268, 571, 276, 563, 409, 430, 398, 441, 290, 549, 304, 535, 308, 531, 358, 481, 316, 523 |
| 752-765 | 293, 546, 288, 551, 284, 555, 368, 471, 253, 586, 256, 583, 263, 576 |
| 766-777 | 242, 597, 274, 565, 402, 437, 383, 456, 357, 482, 329, 510 |
| 778-789 | 317, 522, 307, 532, 286, 553, 287, 552, 266, 573, 261, 578 |
| 790-795 | 236, 603, 303, 536, 356, 483 |
| 796-803 | 355, 484, 405, 434, 404, 435, 406, 433 |
| 804-809 | 235, 604, 267, 572, 302, 537 |
| 810-815 | 309, 530, 265, 574, 233, 606 |
| 816-819 | 367, 472, 296, 543 |
| 820-837 | 336, 503, 305, 534, 373, 466, 280, 559, 279, 560, 419, 420, 240, 599, 258, 581, 229, 610 |

| Root ZC sequence order for preamble format four | | | | | | | | | | | | | | | | | | | | |
|---|---|---|---|---|---|---|---|---|---|---|---|---|---|---|---|---|---|---|---|---|
| Logical root sequence number | Physical root sequence number[a] (in increasing order of the corresponding logical sequence number) | | | | | | | | | | | | | | | | | | | |
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-837 | N/A | | | | | | | | | | | | | | | | | | | |

A WTRU that is adapted to determine a repetition level (e.g., a coverage-limited and/or MTC-adapted WTRU) may generate additional random access preambles beyond those sixty-four random access preambles associated with the first group 305. In the embodiment illustrated in FIG. 3, for example, sixty-four additional random access preambles may be generated so that a total of 128 random access preambles are available for the cell. However, other embodiments may feature other different numbers of random access preambles beyond the at least sixty-four. An access node may indicate another logical root sequence index to the WTRU in a SIB, and this other logical root sequence index may be different than the first logical root sequence used to generate the first sixty-four random access preambles associated with the first group 305. From the other logical root sequence index, the WTRU may determine a corresponding another physical root sequence index for the ZC sequence from which additional random access preambles are to be generated.

Based on its repetition level, a coverage-limited WTRU may be adapted to determine a random access preamble from a group 310-325 other than the first group 305. In various embodiments, a coverage-limited WTRU with an associated repetition level of two may determine a random access preamble from a second group 310 (e.g., a group of random access preambles associated with indices sixty-four through seventy-nine), a coverage-limited WTRU with an associated repetition level of four may determine a random access preamble from a third group 315 (e.g., a group of random access preambles associated with indices eighty through ninety-five), a coverage-limited WTRU with an associated repetition level of eight may determine a random access preamble from a fourth group 320 (e.g., a group of random access preambles associated with indices ninety-six through 111), a coverage-limited WTRU with an associated repetition level of sixteen may determine a random access preamble from a fifth group 325 (e.g., a group of random access preambles associated with indices 112 through 127), and so forth.

According to various embodiments, a random access preamble may be determined by a WTRU based on an estimated path loss. Further to the determination of the random access preamble at the WTRU, the access node may transmit system information to the WTRU that the WTRU is to use in determination of a random access preamble. Where the WTRU receives, from the access node, an indication of a Random Access Preamble (which may be indicated as "ra-PreambleIndex") and a PRACH Mask Index (which may be indicated as "ra-PRACH-MaskIndex") and the ra-PreambleIndex is not signaled as a zero value (e.g., "000000"), then the WTRU may determine the random access preamble based on the explicitly signaled ra-PreambleIndex—e.g., for a contention-free random access procedure between the WTRU and the access node.

In some embodiments of a contention-based random access procedure, the WTRU may determine a random access preamble based on a scheduled transmission to be sent using one or more uplink channel resources (which may be indicated as "Msg3"). A WTRU may be adapted to determine a Group A or a Group B (not shown) from which to select the random access preamble based on the size of the Msg3. If the WTRU has not yet transmitted the Msg3, the size of the Msg3 is greater than a threshold amount associated with Group A (signaled to the WTRU in a SIB), and estimated path loss is less than the maximum output power of a cell provided by the access node (which may be indicated as "$P_{CMAX,c}$") minus both (1) a preamble initial received target power (which may be indicated as "preambleIntialReceivedTargetPower") and (2) a power offset between a random access preamble and the Msg3 (which may be indicated as "deltaPreambleMsg3"), then the WTRU may select a random access preamble associated with Group B. If any of the aforementioned conditions is not satisfied, then the WTRU may select a random access preamble associated with Group A. If the WTRU is to retransmit the Msg3, then the WTRU may determine the random access preamble from either Group A or B determined during a previous attempt to transmit the Msg3. The WTRU may determine a random access preamble from the determined Group A or B based on a random selection in which each of the random access preambles in the respective Group A or B has an equal probability of selection. The WTRU may set the PRACH Mask Index to 0.

In embodiments, a WTRU may be adapted to determine one of the groups 305-325 associated with repetition levels based on a plurality of power offsets associated with a message (e.g., Msg3). The access node may signal the plurality of power offsets to the WTRU in a SIB. According to one embodiment, the WTRU may compare the estimated path loss to a random access power value calculated as $P_{CMAX,c}$ minus (1) the preambleIntialReceivedTargetPower and (2) the deltaPreambleMsg3. If the WTRU determines that the estimated path loss is greater than or equal to the random access power value minus a message power offset associated with the first group 305, then the WTRU may determine that the random access preamble is to be determined from the first group 305. If the WTRU determines that the estimated path loss is less than the random access power value minus the message power offset associated with the first group 305 but is greater than or equal to the random access power value minus a message power offset associated with the second group 310, then the WTRU may determine that the random access preamble is to be determined from the second group 310. If the WTRU determines that the estimated path loss is less than the random access power value minus the message power offset associated with the second group 310 but is greater than or equal to the random access power value minus a message power offset associated with the third group 315, then the WTRU may determine that the random access preamble is to be determined from the third group 315. If the WTRU determines that the estimated path loss is less than the random access power value minus the message power offset associated with the third group 315 but is greater than or equal to the random access power value minus a message power offset associated with the fourth group 320, then the WTRU may determine that the random access preamble is to be determined from the fourth group 320. If the WTRU determines that the estimated path loss does not satisfy any of these comparisons, then the WTRU may determine that the random access preamble is to be determined from the fifth group 325.

To transmit the random access preamble, the WTRU may determine an available subframe associated with the PRACH. This determination may be based on physical layer timing requirements, the PRACH Mask Index, and/or a PRACH configuration index (which may be indicated as "prach-ConfigIndex"), at least one of which may be signaled by the access node in a SIB. If the transmission mode between the WTRU and the access node is time-division duplexing ("TDD"), the PRACH Mask Index is equal to zero, and the ra-PreambleIndex is explicitly signaled by the access node but is not equal to a zero value (e.g., 000000), then the WTRU may determine a PRACH associated with a subframe based on random selection (with equal probability) from a plurality of PRACHs available in the subframe. However, if the ra-PreambleIndex is not signaled or is not equal to a zero value, then the WTRU may randomly select (with equal probability) at least one PRACH from a plurality of PRACHs available in the subframe and the next two subframes. If the transmission mode is not TDD or the PRACH Mask Index is not equal to zero, then the WTRU may determine a PRACH associated with the subframe based on the PRACH Mask Index. Finally, the WTRU may transmit the determined random access preamble.

Figure 4:
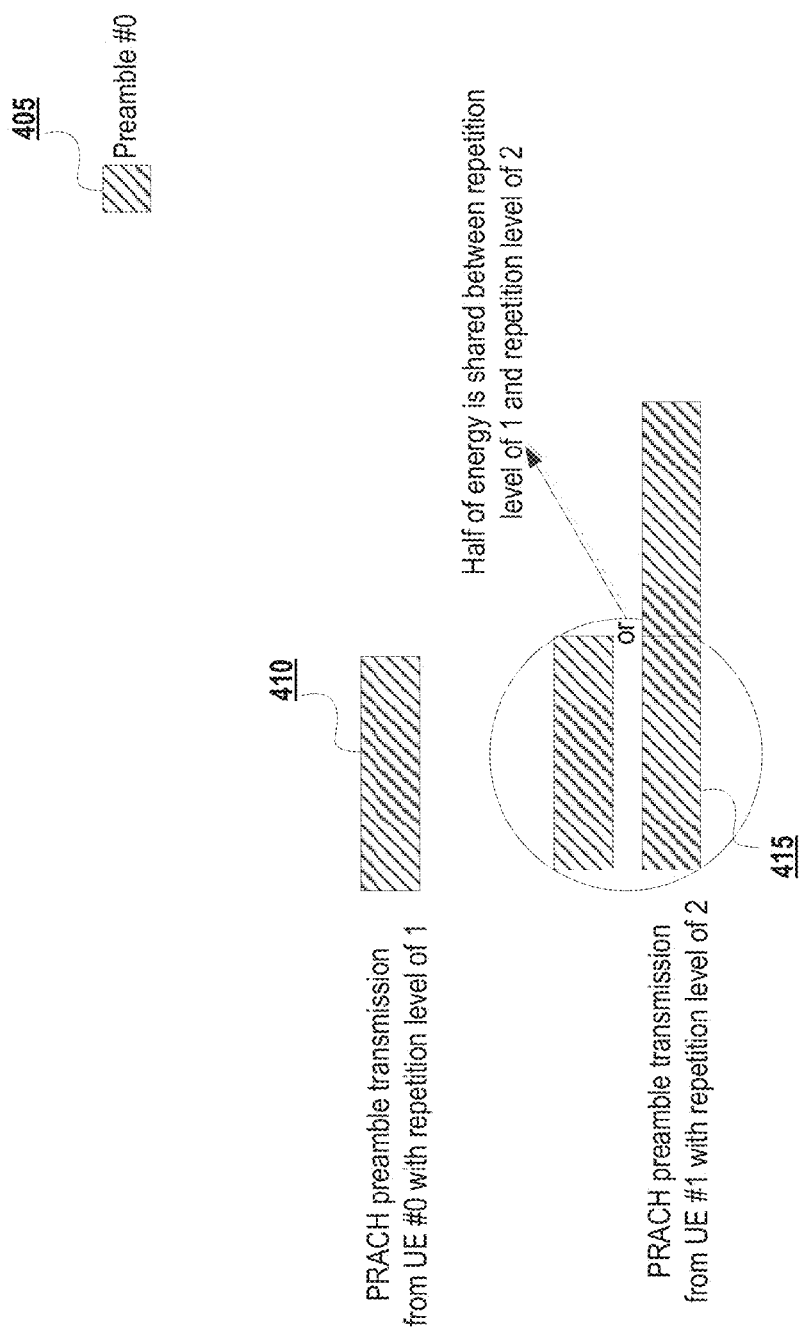
FIG. 4 is a block diagram illustrating a random access preamble that may be transmitted by a plurality of WTRUs such that an access node may be unable to determine respective repetition levels associated with each WTRU of the plurality, in accordance with various embodiments.

Now with reference to FIG. 4, a block diagram illustrates a random access preamble 405 that may be transmitted by a plurality of WTRUs such that an access node may be unable to determine respective repetition levels associated with each WTRU of the plurality, in accordance with various embodiments. A random access preamble 405 may be transmitted by, for example, the WTRUs 120, 125 of FIG. 1 and received by the access node 105 using PRACH 112. The random access preamble 405 may be used in both contention-based and contention-free random access procedures.

In a cell provided by an access node, at least sixty-four random access preambles may be available to WTRUs, and these random access preambles may be generated by application of cyclic shifts to a ZC sequence. Because the number of random access preambles available in a cell is limited, a plurality of WTRUs may determine (e.g., randomly select) a same random access preamble 405. Further, uplink resources may not be explicitly allocated to WTRUs performing the random access procedure, so a plurality of WTRUs potentially may use the same time, frequency, and/or code resources in the transmission of a random access preamble, for example, where such resources are broadcast in a SIB by an access node. As illustrated in FIG. 4, a WTRU with a repetition level of one and/or a legacy WTRU may send the PRACH transmission 410 that includes a random access preamble 405. Contemporaneously, another WTRU that determines its repetition level to be greater than one (e.g., two), may send another PRACH transmission 415 that includes the same random access preamble 405 as the first WTRU's PRACH transmission 410. In this "false alarm" scenario, an access node that contemporaneously receives the two PRACH transmissions 410, 415 from the two WTRUs may be unable to determine a repetition level associated with one or both of the WTRUs and/or may mistakenly associate an incorrect repetition level with one or both of the WTRUs.

Figure 5:
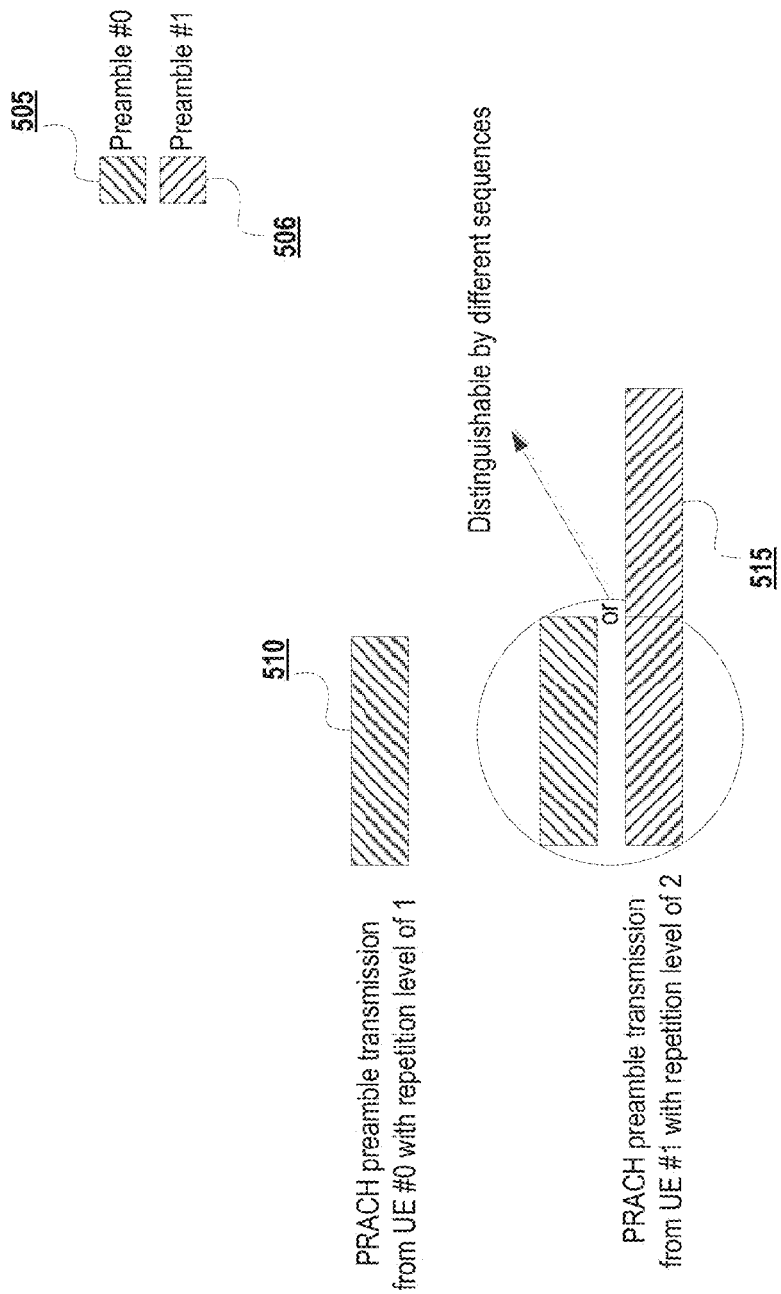
FIG. 5 is a block diagram illustrating a plurality of random access preambles that may be transmitted by a plurality of WTRUs such that an access node may determine respective repetition levels associated with each WTRU of the plurality, in accordance with various embodiments.

In connection with FIG. 4, FIG. 5 illustrates a block diagram of a plurality of random access preambles 505, 506 that may be transmitted by a plurality of WTRUs such that an access node may determine respective repetition levels associated with each WTRU of the plurality, in accordance with various embodiments. A first random access preamble 505 may be transmitted by, for example, the WTRUs 120, 125 of FIG. 1 and received by the access node 105 using PRACH 112. A second random access preamble 506 may be transmitted by a WTRU that is adapted to determine a repetition level, for example, the coverage-limited and/or MTC-enabled WTRU 125 of FIG. 1 and received by the access node 105 using PRACH 112. The random access preambles 505, 506 may be used in both contention-based and contention-free random access procedures.

In a cell provided by an access node, at least sixty-four random access preambles may be available to WTRUs, and these random access preambles may be generated by application of cyclic shifts to a ZC sequence. The access node may broadcast one or more SIBs that include a logical root sequence index and an indication of one or more resources that are to be used for transmission of a random access preamble. A WTRU with a repetition level of one and/or a legacy WTRU may be adapted to generate a first random access preamble 505 based on the information from the one or more SIBs. The WTRU would then transmit the first random access preamble 505 as the PRACH transmission 510 based on one or more resources indicated in the one or more SIBs.

In various embodiments, a coverage-limited WTRU may be adapted to determine a repetition level greater than one (e.g., a repetition level of two) and determine a second random access preamble 506 based on the repetition level greater than one. The second random access preamble 506 may be determined from a plurality of random access preambles greater than the sixty-four available to legacy WTRUs and/or WTRUs with a repetition level of one. However, the second random access preamble 506 may be one of the sixty-four available to legacy WTRUs and/or WTRUs with a repetition level of one in other embodiments. A coverage-limited WTRU with a repetition level of greater than one may be adapted to generate the second random access preamble 506 based on the information from the one or more SIBs. The coverage-limited WTRU would then transmit the second random access preamble 506 as the PRACH transmission 515 based on one or more resources indicated in the one or more SIBs. In some embodiments, one or more resources used in the PRACH transmission 515 of the second random access preamble 506 may differ from those used in the PRACH transmission 510 of the first random access preamble 505. An access node may be able to differentiate between the two random access preambles 505, 506, particularly when the access node contemporaneously receives the two random access preambles 505, 506. Further, the access node receiving the second random access preamble 506 as PRACH transmission 515 may be able to determine the repetition level associated with a coverage-limited WTRU. As illustrated in FIG. 5, this arrangement may prevent the "false alarm" scenario described with respect to FIG. 4.

Figure 6:
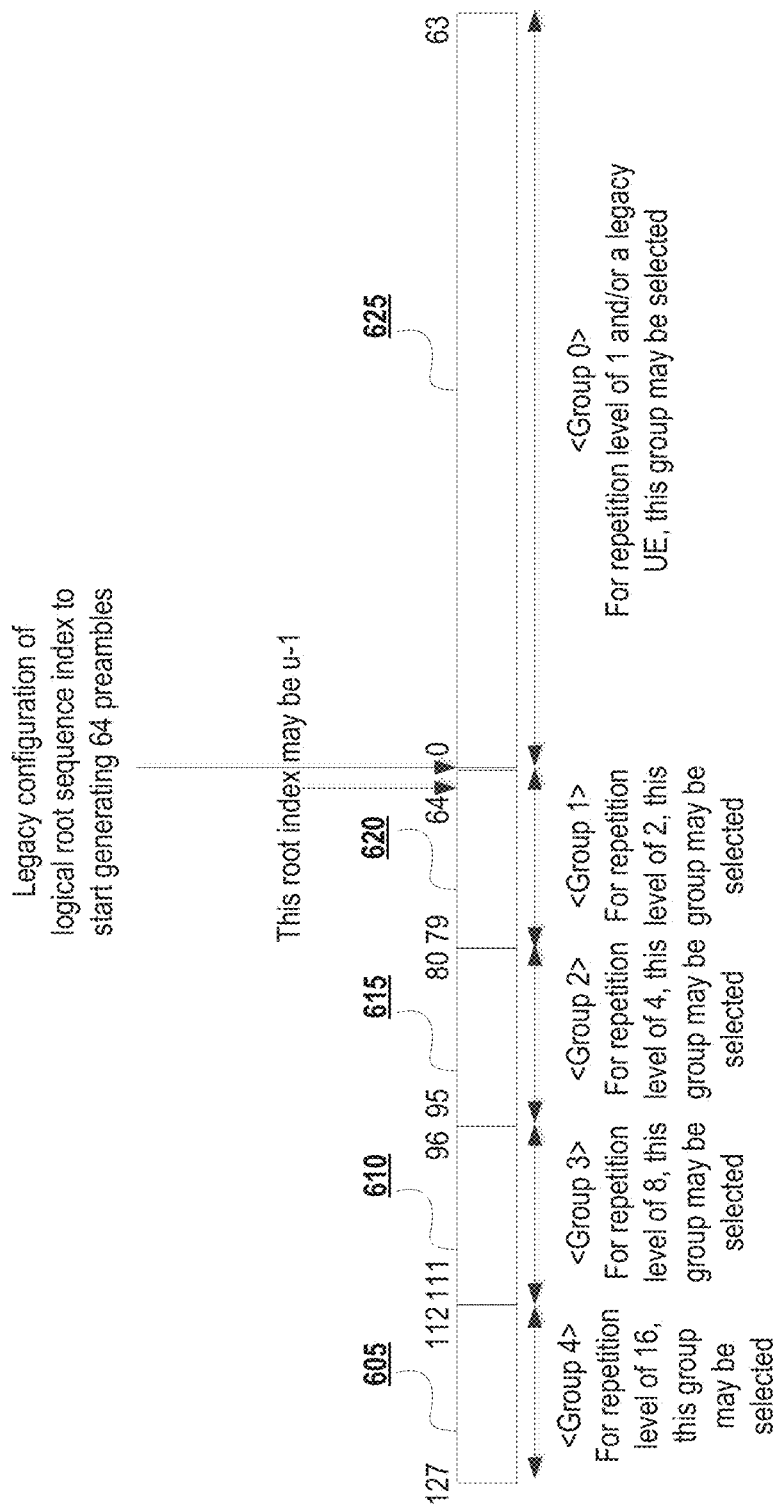
FIG. 6 is a block diagram illustrating a plurality of groups of random access preambles that a WTRU may transmit to an access node to indicate a repetition level associated with the WTRU, in accordance with various embodiments.

With respect to FIG. 6, a block diagram illustrates a plurality of groups 605-625 of random access preambles that a WTRU may transmit to an access node to indicate a repetition level associated with the WTRU, in accordance with various embodiments. A random access preamble from one of the groups 605-625 may be utilized by, for example, the WTRUs 120, 125 of FIG. 1 when transmitting random access preambles to the access node 105 using PRACH 112. Correspondingly, an access node may be adapted to receive random access preambles from the groups 605-625. The random access preambles from the groups 605-625 may be used in both contention-based and contention-free random access procedures.

In a cell provided by an access node, at least sixty-four random access preambles may be available to WTRUs, and these random access preambles may be generated by application of cyclic shifts to a ZC sequence. An access node may indicate a logical root sequence index to a WTRU in a SIB, and the WTRU may determine a corresponding physical root sequence index for the ZC sequence from which the at least sixty-four random access preambles are to be generated—e.g., the WTRU may access a lookup table to determine a physical root sequence index u that corresponds to a logical root sequence index indicated by the access node in a SIB. The first sixty-four random access preambles may be considered a first group 625 that is to be used by, for example, a legacy WTRU (e.g., a WTRU that is not adapted to determine a repetition level), a WTRU that is not adapted for MTC, and/or a WTRU that determines its repetition level to be one. As illustrated in FIG. 6, these sixty-four random access preambles are generated in the positive direction—e.g., a WTRU may generate the first sixty-four preambles based on application of increasing cyclic shifts to a root ZC sequence. Correspondingly, an access node that receives and processes a random access preamble from the first group 625 may determine that the transmitting WTRU is associated with a repetition level of one.

A WTRU that is adapted to determine a repetition level (e.g., a coverage-limited and/or MTC-adapted WTRU) may generate additional random access preambles beyond those sixty-four random access preambles associated with the first group 625. In the embodiment illustrated in FIG. 6, for example, sixty-four additional random access preambles may be generated so that a total of 128 random access preambles are available for the cell. However, other embodiments may feature other different numbers of random access preambles beyond the at least sixty-four.

Based on its repetition level, a coverage-limited WTRU may be adapted to determine a random access preamble from a group 605-620 other than the first group 625. As illustrated in FIG. 6, additional random access preambles beyond the sixty-four random access preambles available in the first group 625 may be generated in the negative direction. For example, a WTRU may generate the first sixty-four preambles based on application of increasing cyclic shifts to a root ZC sequence and generate additional preambles based on application of decreasing cyclic shifts to the physical root sequence, where the physical root sequence is found based on determining a physical root sequence index u from a logical root sequence index communicated by the access node to the WTRU in a SIB. In various embodiments, a coverage-limited WTRU with an associated repetition level of two may determine a random access preamble from a second group 620, a coverage-limited WTRU with an associated repetition level of four may determine a random access preamble from a third group 615, a coverage-limited WTRU with an associated repetition level of eight may determine a random access preamble from a fourth group 610, a coverage-limited WTRU with an associated repetition level of sixteen may determine a random access preamble from a fifth group 605, and so forth.

In various embodiments, the additional random access preambles (e.g., those random access preambles associated with groups 605-620) may be found based on decreasing cyclic shifts of a root ZC sequence that is determined based on a logical root sequence index. The WTRU may be adapted to determine the logical root sequence index based on information transmitted to the WTRU by an access node in a SIB. In one embodiment, the access node may transmit a SIB that includes a root sequence value (which may be indicated as "RACH_ROOT_SEQUENCE"), and the WTRU may determine the logical root sequence index based on the root sequence value minus one and then modulo the maximum number of root indices (e.g., 838 maximum root indices for preamble formats zero through three, and 138 maximum root indices for preamble format four). With respect to the first sixty-four preambles associated with the first group 625, if sixty-four cannot be generated from a single root ZC sequence, then the WTRU may determine another root ZC sequence with a consecutive logical root sequence index until the sixty-four random access preambles are generated. For additional random access preambles beyond the sixty-four, such as random access preambles associated with groups 605-620, decreasing cyclic shifts can be applied to the root ZC sequence that is determined based on a logical root sequence index. Similar to the first sixty-four, if the additional random access preambles (e.g., those random access preambles associated with groups 605-620) cannot be generated from a single root ZC sequence, then the WTRU may determine another root ZC sequence with a preceding logical root sequence index until the additional random access preambles are generated.

Figure 7:
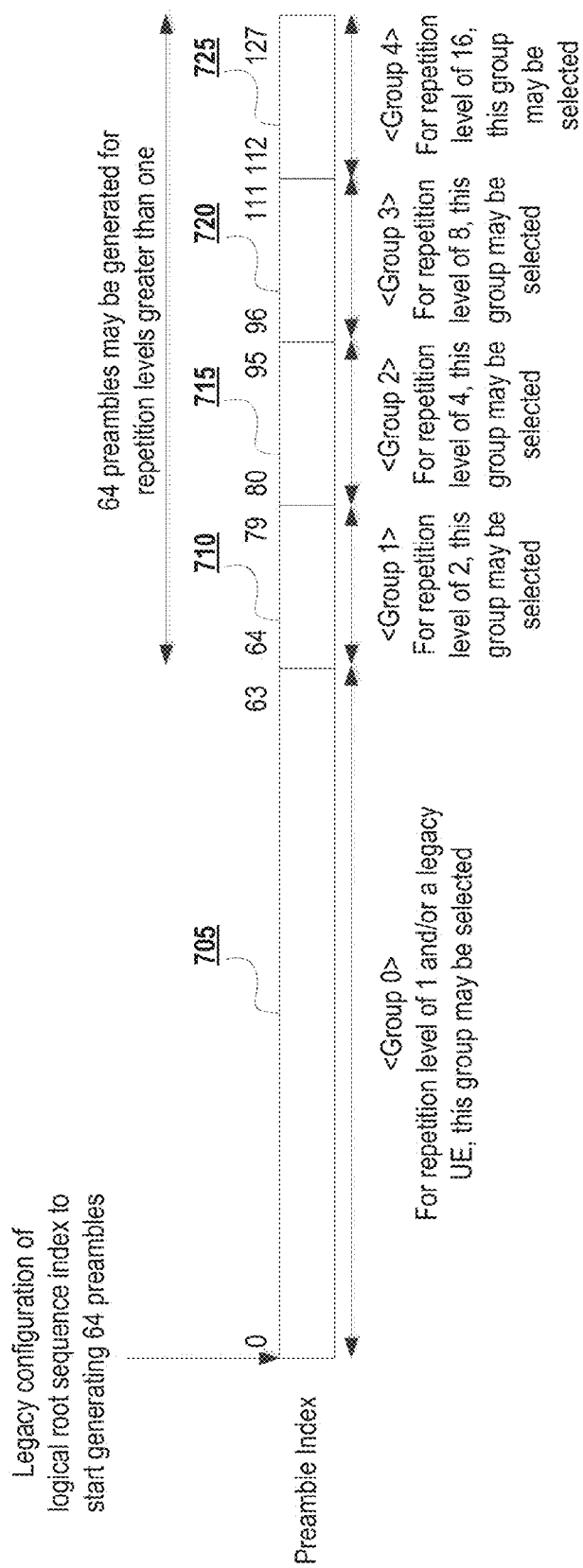
FIG. 7 is a block diagram illustrating a plurality of groups of random access preambles that a WTRU may transmit to an access node to indicate a repetition level associated with the WTRU, in accordance with various embodiments.

With respect to FIG. 7, a block diagram illustrates a plurality of groups 705-725 of random access preambles that a WTRU may transmit to an access node to indicate a repetition level associated with the WTRU, in accordance with various embodiments. A random access preamble from one of the groups 705-725 may be utilized by, for example, the WTRUs 120, 125 of FIG. 1 when transmitting random access preambles to the access node 105 using PRACH 112. Correspondingly, an access node may be adapted to receive random access preambles from the groups 705-725. The random access preambles from the groups 705-725 may be used in both contention-based and contention-free random access procedures.

In a cell provided by an access node, at least sixty-four random access preambles may be available to WTRUs, and these random access preambles may be generated by application of cyclic shifts to a ZC sequence. An access node may indicate a logical root sequence index to a WTRU in a SIB, and the WTRU may determine a corresponding physical root sequence index for the ZC sequence from which the at least sixty-four random access preambles are to be generated—e.g., the WTRU may access a lookup table to determine a physical root sequence index u that corresponds to a logical root sequence index indicated by the access node in a SIB. The first sixty-four random access preambles may be considered a first group 705 that is to be used by, for example, a legacy WTRU (e.g., a WTRU that is not adapted to determine a repetition level), a WTRU that is not adapted for MTC, and/or a WTRU that determines its repetition level to be one. A WTRU is to generate these first sixty-four random access preambles associated with the first group 705 based on a logical root sequence index that is transmitted by an access node to the WTRU in a SIB.

A WTRU that is adapted to determine a repetition level (e.g., a coverage-limited and/or MTC-adapted WTRU) may generate additional random access preambles beyond those sixty-four random access preambles associated with the first group 705. In the embodiment illustrated in FIG. 7, for example, sixty-four additional random access preambles may be generated so that a total of 128 random access preambles are available for the cell. However, other embodiments may feature other different numbers of random access preambles beyond the at least sixty-four.

Based on its repetition level, a coverage-limited WTRU may be adapted to determine a random access preamble from a group 710-725 other than the first group 705. As illustrated in FIG. 7, additional random access preambles beyond the sixty-four random access preambles available in the first group 705 may be generated from the same logical root sequence index signaled by the access node to the WTRU in a SIB. For example, a WTRU may generate the first sixty-four preambles based on application of increasing cyclic shifts to a root ZC sequence and generate additional preambles based on application of further increasing cyclic shifts to the physical root sequence, where the physical root sequence is found based on determining a physical root sequence index u from a logical root sequence index communicated by the access node to the WTRU in a SIB. In various embodiments, a coverage-limited WTRU with an associated repetition level of two may determine a random access preamble from a second group 710, a coverage-limited WTRU with an associated repetition level of four may determine a random access preamble from a third group 715, a coverage-limited WTRU with an associated repetition level of eight may determine a random access preamble from a fourth group 720, a coverage-limited WTRU with an associated repetition level of sixteen may determine a random access preamble from a fifth group 725, and so forth.

In various embodiments, the additional random access preambles (e.g., those random access preambles associated with groups 710-725) may be found based on increasing cyclic shifts of a root ZC sequence that is determined based on a logical root sequence index. The WTRU may be adapted to determine the logical root sequence index based on information transmitted to the WTRU by an access node in a SIB. In one embodiment, the access node may transmit a SIB that includes a root sequence value (which may be indicated as "RACH_ROOT_SEQUENCE"), and the WTRU may determine the logical root sequence index based on the root sequence value minus one and then modulo the maximum number of root indices (e.g., 838 maximum root indices for preamble formats zero through three, and 138 maximum root indices for preamble format four). With respect to the first sixty-four preambles associated with the first group 705, if sixty-four cannot be generated from a single root ZC sequence, then the WTRU may determine another root ZC sequence with a consecutive logical root sequence index until the sixty-four random access preambles are generated. For additional random access preambles beyond the sixty-four, such as random access preambles associated with groups 710-725, increasing cyclic shifts can be applied to the root ZC sequence that is determined based on a logical root sequence index. Similar to the first sixty-four, if the additional random access preambles (e.g., those random access preambles associated with groups 710-725) cannot be generated from a single root ZC sequence, then the WTRU may determine another root ZC sequence with a consecutive logical root sequence index until the additional random access preambles are generated.

Figure 8:
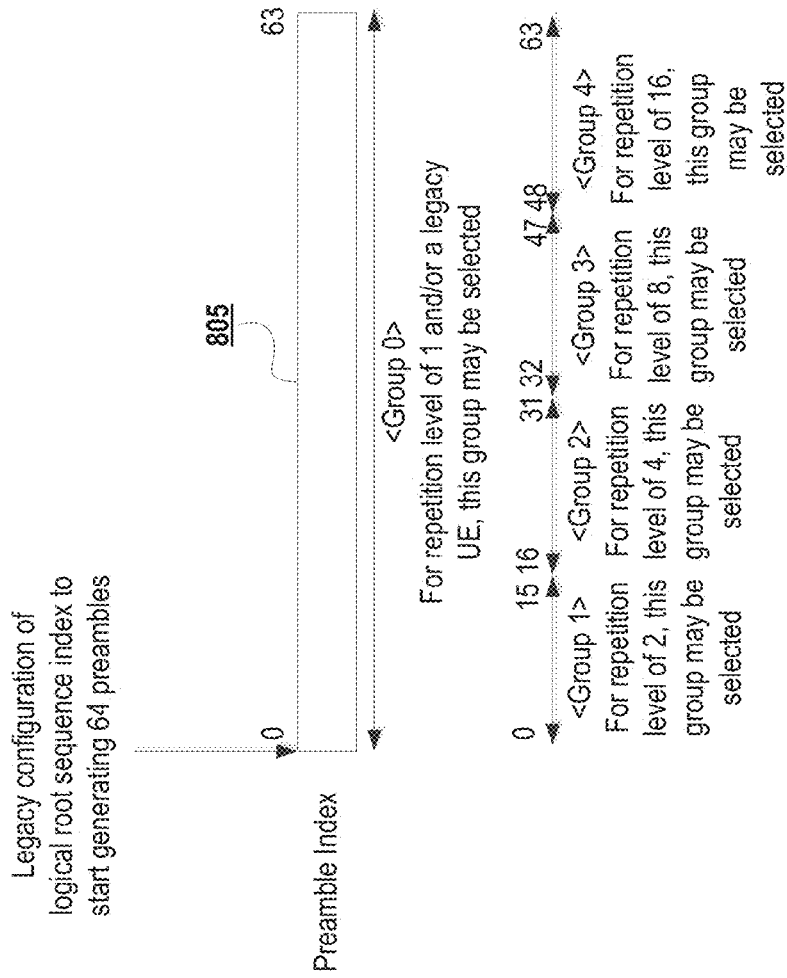
FIG. 8 is a block diagram illustrating a group of random access preambles that may be shared by legacy WTRUs, non-coverage-limited WTRUs, non-machine type communication ("MTC") WTRUs, and/or WTRUs that are coverage-limited and/or MTC-adapted, in accordance with various embodiments.

Turning to FIG. 8, a block diagram illustrates a group 805 of random access preambles that may be shared by legacy WTRUs, non-coverage-limited WTRUs, non-MTC WTRUs, and/or coverage-limited and MTC-adapted WTRUs, in accordance with various embodiments. A random access preamble from one of the groups 705-725 may be utilized by, for example, the WTRUs 120, 125 of FIG. 1 when transmitting random access preambles to the access node 105 using PRACH 112. Correspondingly, an access node may be adapted to receive random access preambles from the groups 705-725. The random access preambles from the groups 705-725 may be used in both contention-based and contention-free random access procedures.

In a cell provided by an access node, sixty-four random access preambles may be available to WTRUs, and these random access preambles may be generated by application of cyclic shifts to a root ZC sequence. An access node may indicate a logical root sequence index to a WTRU in a SIB, and the WTRU may determine a corresponding physical root sequence index u for the root ZC sequence from which the at least sixty-four random access preambles are to be generated—e.g., the WTRU may access a lookup table to determine a physical root sequence index u that corresponds to a logical root sequence index indicated by the access node in a SIB. The sixty-four random access preambles may be associated with a first group 805 that is to be used by, for example, a legacy WTRU (e.g., a WTRU that is not adapted to determine a repetition level), a WTRU that is not adapted for MTC, and/or a WTRU that determines its repetition level to be one.

Based on its repetition level, a coverage-limited WTRU may be adapted to determine a random access preamble from a group 805. In various embodiments, a coverage-limited WTRU with an associated repetition level of two may determine a random access preamble from the group 805, but determined from the first sixteen random access preambles associated with the sixty-four of the group 805. A coverage-limited WTRU with an associated repetition level of four may determine a random access preamble from the group 805, but determined from the second set of sixteen random access preambles associated with the sixty-four of the group 805. A coverage-limited WTRU with an associated repetition level of eight may determine a random access preamble from the group 805, but determined from the third set of sixteen random access preambles associated with the sixty-four of the group 805. A coverage-limited WTRU with an associated repetition level of sixteen may determine a random access preamble from the group 805, but determined from the last sixteen random access preambles associated with the sixty-four of the group 805.

In various embodiments, a WTRU that determines its repetition level to be greater than one may use a different PRACH opportunity to transmit the determined random access preamble. For example, a legacy WTRU and/or a WTRU with a repetition level of one may transmit a random access preamble using a first PRACH opportunity associated with a first time resource, a first frequency resource, and/or a first code resource. However, a WTRU that determines its repetition level to be greater than one may transmit a random access preamble (selected according to the group corresponding to the repetition level) using a second PRACH opportunity associated with a second time resource, a second frequency resource, and/or a second code resource. In various embodiments, an access node that is to receive and process the random access preambles may be able to distinguish WTRUs associated with a repetition level of one from WTRUs associated with other repetition levels based on at least one of the random access preambles and/or the resource(s) used for transmission of the random access preamble.

Figure 9:
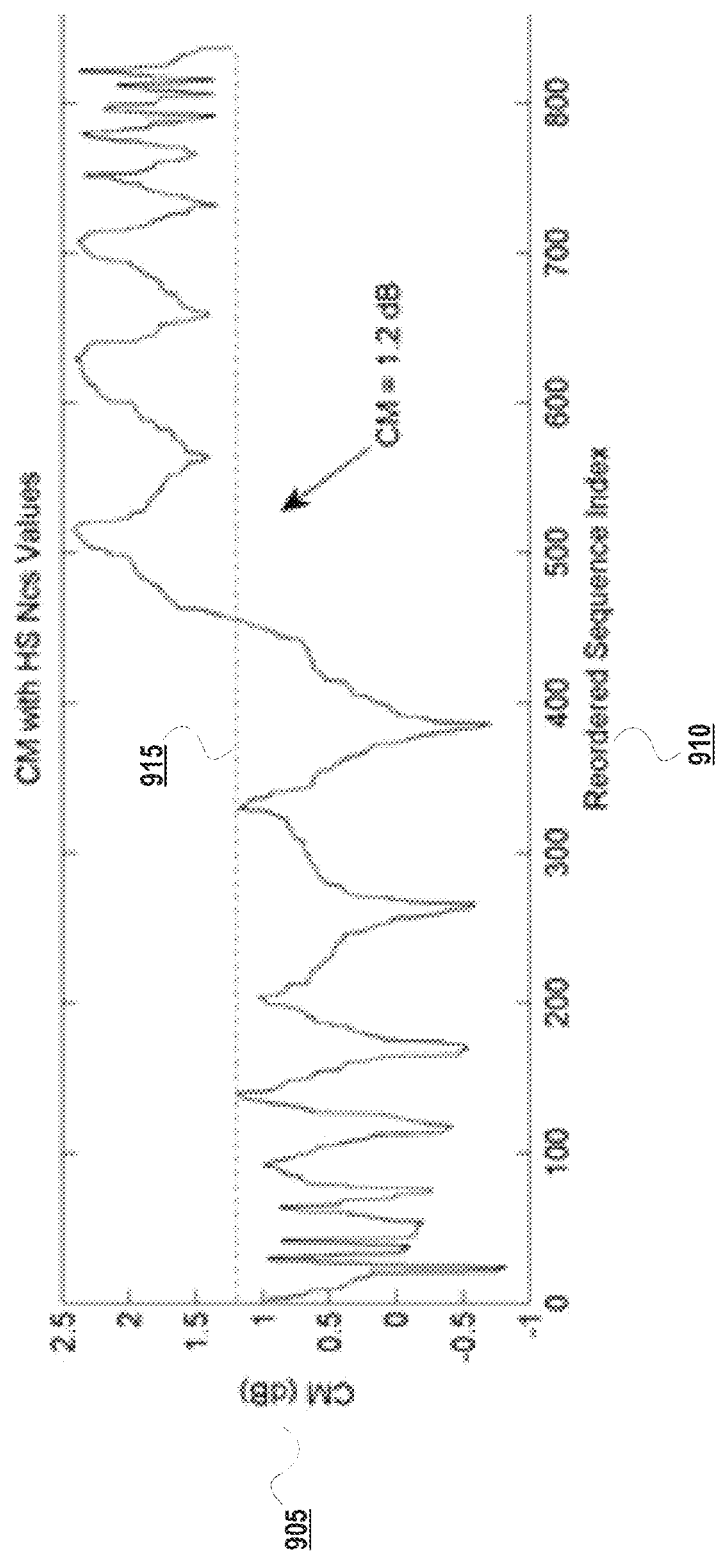
FIG. 9 is a block diagram illustrating a graph for selection of a logical root sequence index based on a cubic metric value, in accordance with various embodiments.

With reference to FIG. 9, a block diagram illustrates a graph for selection of a logical root sequence index 910 based on a cubic metric ("CM") value 905, in accordance with various embodiments. A logical root sequence index may be utilized by, for example, the WTRUs 120, 125 of FIG. 1 when transmitting random access preambles to the access node 105 using PRACH 112. The CM may be similar to a peak-to-average power ratio ("PAPR"). In the context of FIG. 1, the CM may indicate coverage of a cell 110 provided by an access node 105. A relatively high CM may indicate that the coverage of the cell 110 is reduced because of power amplifier ("PA") back-off by a WTRU (e.g., the coverage-limited WTRU 125).

In various embodiments, a logical root sequence index 910 may be determined based on a CM value 905. A logical root sequence index 910 having a lower CM value 905 may be used by a coverage-limited WTRU because the back-off for a PA may be mitigated or avoided. According to an embodiment, a logical root sequence index 910 may be determined such that a coverage-limited WTRU is to generate random access preambles based on a relatively lower logical root sequence index 910 that corresponds to a CM value 905 below a threshold 915. The threshold 915 may be, for example, a CM value 905 of 1.2 decibels ("dB") for quadrature phase shift keying ("QPSK"). Therefore, an access node may signal a coverage-limited WTRU so that a logical root sequence index that corresponds to a CM value 905 that is less than the threshold 915 is used for generation of random access preambles. For example, an access node may transmit a SIB to a coverage-limited, and possibly MTC-adapted, WTRU that includes an indication of a logical root sequence index (e.g., as a field "rootSequenceIndex_MTC"). In the illustrated embodiment, for example, the indication of the logical root sequence index associated with a CM value 905 less than the threshold 915 may be inclusively between 0 and 455. The access node may transmit a SIB to other WTRUs (e.g., legacy WTRUs, non-coverage-limited WTRUs, and/or non-MTC WTRUs) that includes another indication of another logical root sequence index that corresponds to a CM value 905 above the threshold 915—e.g., the other logical root sequence index may be inclusively between 456 and 838.

In some embodiments, the maximum value of a logical root sequence index available to a coverage-limited and/or MTC-adapted WTRU may be a power of two, which may improve signaling management between an access node and the WTRU. According to an embodiment, the maximum value of the logical root sequence index may be the power of two closest to the logical root sequence index 910 corresponding to the CM value 905 at the threshold 915. For example, where the threshold 915 is 1.2 dB, the logical root sequence index 910 corresponding to the CM value 905 may be 455 and, therefore, the maximum value of a logical root sequence index available to a coverage-limited and/or MTC-adapted WTRU may be 256 (two to the power of eight) or 512 (two to the power of nine), depending on whether the maximum value is to exceed the logical root sequence index 910 corresponding to the CM value 905 at the threshold 915.

Various embodiments of this approach to signaling the logical root sequence index may obviate one or more parameters associated with mobility support, such as a high speed flag value that is to indicate a cyclic shift value $N_{cs}$ to be used for random access preamble generation. For example, a coverage-limited WTRU may assume a high speed flag value (indicated in a "High-speed-flag" field of a SIB) is false and/or an access node may omit a high speed flag value in a SIB to be broadcast to coverage-limited WTRUs. In such embodiments, a coverage-limited WTRU may rely on an unrestricted set and ignore the restricted set, given in the following table (where zeroCorrelationZoneConfig may be signaled in a SIB).

| $N_{cs}$ for preamble generation (preamble formats zero through three) | | |
|---|---|---|
| | $N_{CS}$ value | |
| zeroCorretationZoneConfig | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

Figure 10:
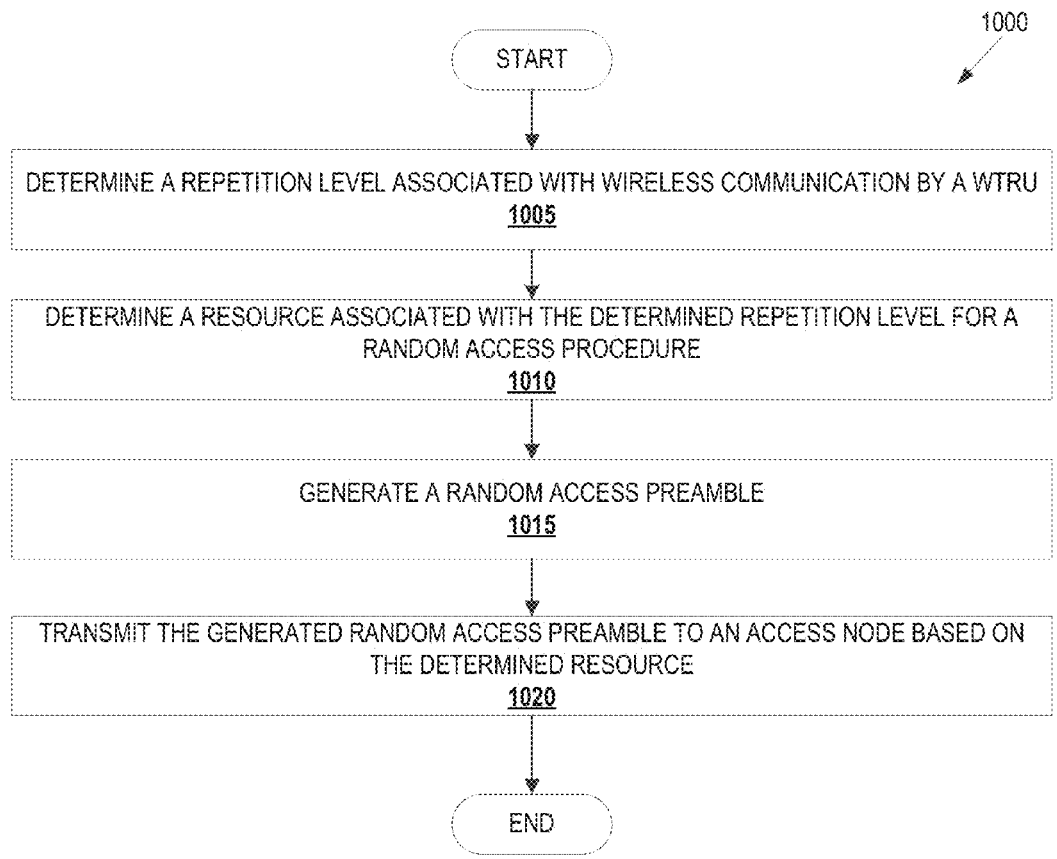
FIG. 10 is a flow diagram illustrating a method for determining a resource opportunity associated with transmission of a random access preamble, in accordance with various embodiments.

With respect to FIG. 10, a flow diagram illustrates a method 1000 for determining a resource opportunity associated with transmission of a random access preamble, in accordance with various embodiments. The method 1000 may be performed by a WTRU, such as one of the WTRUs 120, 125 of FIG. 1. While FIG. 10 illustrates a plurality of sequential operations, one of ordinary skill would understand that one or more operations of the method 1000 may be transposed and/or performed contemporaneously.

To begin, the method 1000 may include operation 1005 for determining a repetition level associated with wireless communication by a WTRU. In various embodiments, determining the repetition level may be based on estimating a path loss. The repetition level may be associated with a number of times data is communicated in a channel between an access node and a WTRU. A repetition level of one may be used by legacy WTRUs, non-MTC WTRUs, and/or non-coverage-limited WTRUs. Repetition levels greater than one may be used by WTRUs that are MTC-adapted and/or have limited coverage.

At operation 1010, the method 1000 may include determining a resource associated with the determined repetition level. The resource may be used to perform a random access procedure based on the determined repetition level. According to the embodiment, the resource may be at least one of a time resource, a frequency resource, and/or a code resource. A code resource may be at least one of a root sequence index (e.g., a logical root sequence index or a physical root sequence index) or a cyclic shift. In another embodiment, a code resource may be a combination of a root sequence index (e.g., a logical root sequence index or a physical root sequence index) and a cyclic shift. In one embodiment of operation 1010, a plurality of resources is determined. In various embodiments, the determining of the resource may be based on system information (e.g., a SIB) received from an access node. For example, system information may include an indication of at least two resource opportunities—one to be used for WTRUs associated with a repetition level of one and another to be used for WTRUs associated with a repetition level greater than one. The corresponding resource may then be selected based on the determined repetition level.

Operation 1015 may include generating a random access preamble. Operation 1015 may be associated with operations for generating a plurality of random access preambles based on applying a plurality of cyclic shifts to a root sequence and selecting a random access preamble of the plurality (e.g., randomly selecting a random access preamble for contention-based random access or selecting a random access preamble according to information provided by an access node).

Subsequently, operation 1020 may include transmitting the generated random access preamble to an access node based on the determined resource. In embodiments, operation 1020 may include transmitting the random access preamble at an opportunity associated with the determined resource—e.g., at a subframe associated with a determined time resource and/or in a resource block associated with a determined frequency resource.

Figure 11:
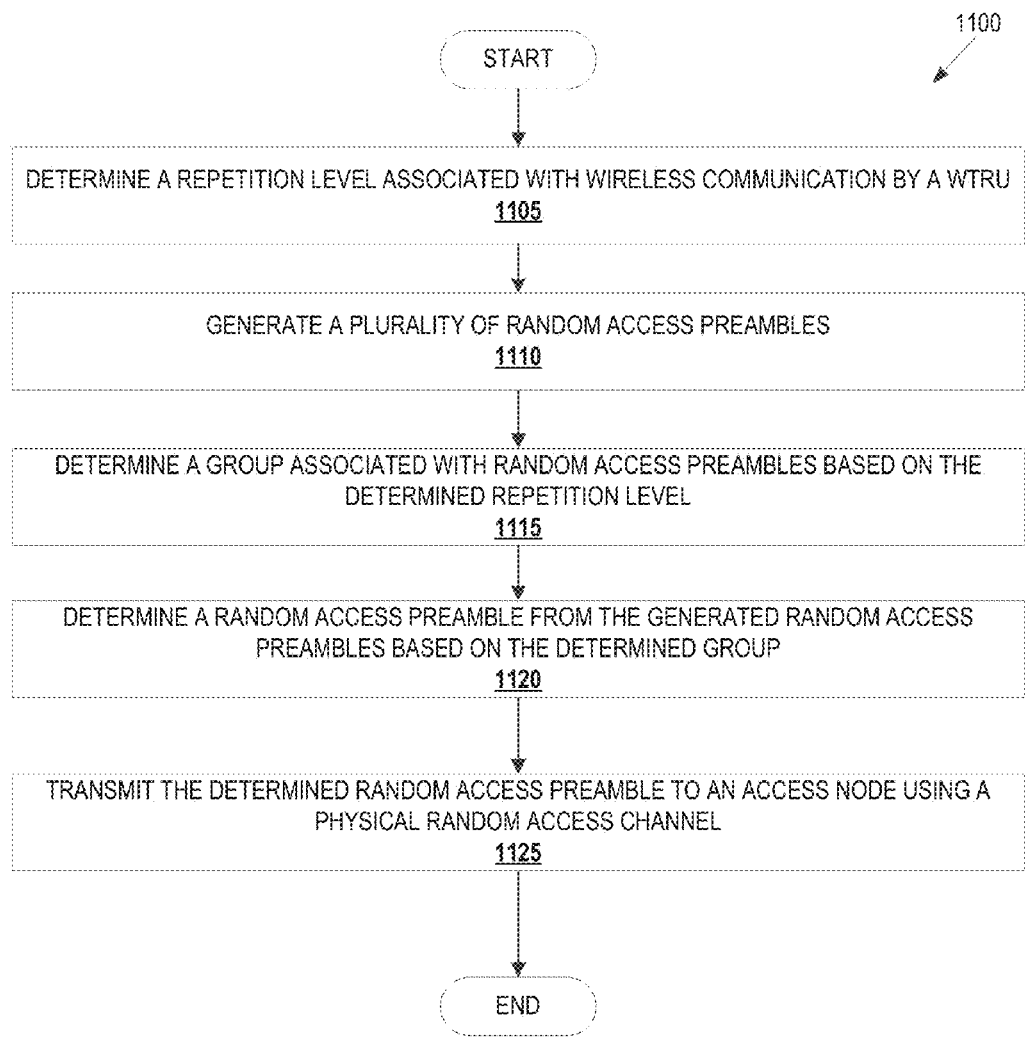
FIG. 11 is a flow diagram illustrating a method for determining a group associated with random access preambles based on a repetition level, in accordance with various embodiments.

In reference to FIG. 11, a flow diagram illustrates a method 1100 for determining a group associated with random access preambles based on a repetition level, in accordance with various embodiments. The method 1100 may be performed by a WTRU, such as one of the WTRUs 120, 125 of FIG. 1. While FIG. 11 illustrates a plurality of sequential operations, one of ordinary skill would understand that one or more operations of the method 1100 may be transposed and/or performed contemporaneously.

Beginning first with operation 1105, the method 1100 may include determining a repetition level associated with wireless communication by a WTRU. In various embodiments, determining the repetition level may be based on estimating a path loss. The repetition level may be associated with a number of times data is communicated in a channel between an access node and a WTRU. A repetition level of one may be used by legacy WTRUs, non-MTC WTRUs, and/or non-coverage-limited WTRUs. Repetition levels greater than one may be used by WTRUs that are MTC-adapted and/or have limited coverage.

Operation 1110 may include generating a plurality of random access preambles. In various embodiments, the plurality of random access preambles may be generated based on applying a plurality of cyclic shifts to a root sequence. Operation 1115 may include determining a group associated with random access preambles based on the determined repetition level. In embodiments, a first group of sixty-four random access preambles may be available to legacy WTRUs, non-MTC WTRUs, and/or non-coverage-limited WTRUs. According to one embodiment, random access preambles beyond the first group of sixty-four may be generated, and the determined group may include a preamble that is not included in the first group of sixty-four. For example, a second group of sixteen random access preambles beyond the first group of sixty-four may be generated, and the second group may be available to coverage-limited WTRUs associated with a repetition level of two.

According to another embodiment, a subset of the first group of sixty-four random access preambles may be associated with both the first group and a second group having a repetition level greater than one—e.g., the sixty-four random access preambles may be available to legacy WTRUs, non-MTC WTRUs, and/or non-coverage-limited WTRUs, and the first sixteen random access preambles may also be associated with a second group available to coverage-limited WTRUs associated with a repetition level of two.

In various embodiments, the determining of the group may be based on system information (e.g., a SIB) received from an access node. For example, system information may include an indication of at least two groups—one to be used for WTRUs associated with a repetition level of one and another to be used for WTRUs associated with a repetition level greater than one. The corresponding group may then be selected based on the determined repetition level.

Operation 1120 may include determining a random access preamble of the plurality of random access preambles based on the determined group. According to embodiments, operation 1120 may include randomly selecting a random access preamble associated with the determined group for contention-based random access or selecting a random access preamble associated with the determined group according to information provided by an access node for contention-free random access. Subsequently, operation 1125 may include transmitting the determined random access preamble to an access node using a PRACH.

Figure 12:
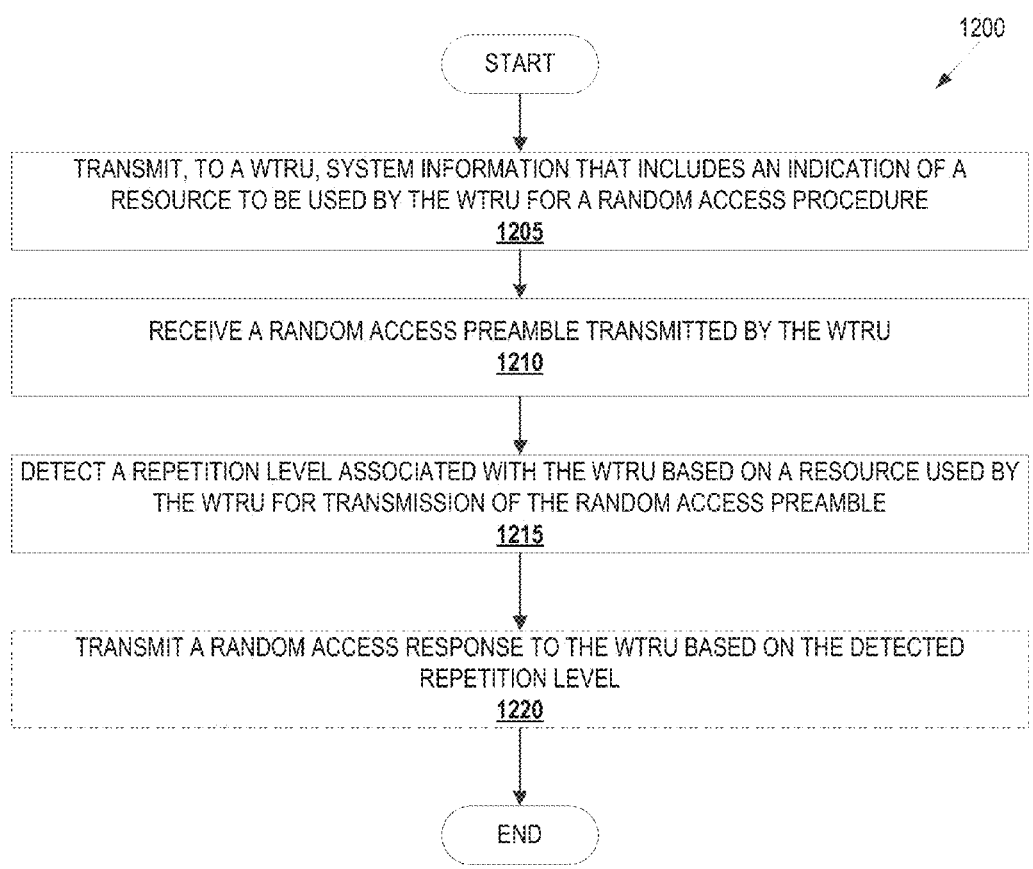
FIG. 12 is a flow diagram illustrating a method for detecting a repetition level associated with a WTRU based on a random access procedure, in accordance with various embodiments.

Turning to FIG. 12, a flow diagram illustrates a method 1200 for detecting a repetition level associated with a WTRU based on a random access procedure, in accordance with various embodiments. The method 1200 may be performed by an access node, such as one of the access node 105 of FIG. 1. While FIG. 12 illustrates a plurality of sequential operations, one of ordinary skill would understand that one or more operations of the method 1200 may be transposed and/or performed contemporaneously.

Starting with operation 1205, the method 1200 may comprise transmitting, to a WTRU, system information (e.g., one or more SIBs) that includes an indication of a resource to be used by the WTRU for a random access procedure. The system information may be transmitted as a broadcast to a plurality of WTRUs that operate on a cell. According to the embodiment, the resource may be at least one of a time resource, a frequency resource, and/or a code resource. A code resource may be at least one of a root sequence index (e.g., a logical root sequence index or a physical root sequence index) or a cyclic shift. In another embodiment, a code resource may be a combination of a root sequence index (e.g., a logical root sequence index or a physical root sequence index) and a cyclic shift. In one embodiment of operation 1205, a plurality of indications associated with a plurality of resources is included in the system information. In various embodiments, the system information (e.g., a SIB) may include an indication of at least two resource opportunities—one to be used for WTRUs associated with a repetition level of one and another to be used for WTRUs associated with a repetition level greater than one.

Operation 1210 may include receiving a random access preamble transmitted by the WTRU. The random access preamble may be received according to one or more resource opportunities indicated in the system information. Based on the resource opportunities associated with the receiving of the random access preamble, operation 1215 may include detecting a repetition level associated with the transmitting WTRU. The repetition level may be associated with a number of times data is communicated in a channel between an access node and the transmitting WTRU. For example, if a random access preamble is received according to a first resource opportunity, then an access node may determine that one repetition of data is sufficient—e.g., a repetition level of one may be associated with legacy WTRUs, non-MTC WTRUs, and/or non-coverage-limited WTRUs. Similarly, if a random access preamble is received according to a second resource opportunity, then an access node may determine that additional repetitions of data may benefit the transmitting WTRU, which may be MTC-adapted and/or have limited coverage. In response to the received random access preamble, the method 1200 may include an operation 1220 for transmitting a random access response to the WTRU. In some embodiments, the random access response may be repeated based on the detected repetition level.

Figure 13:
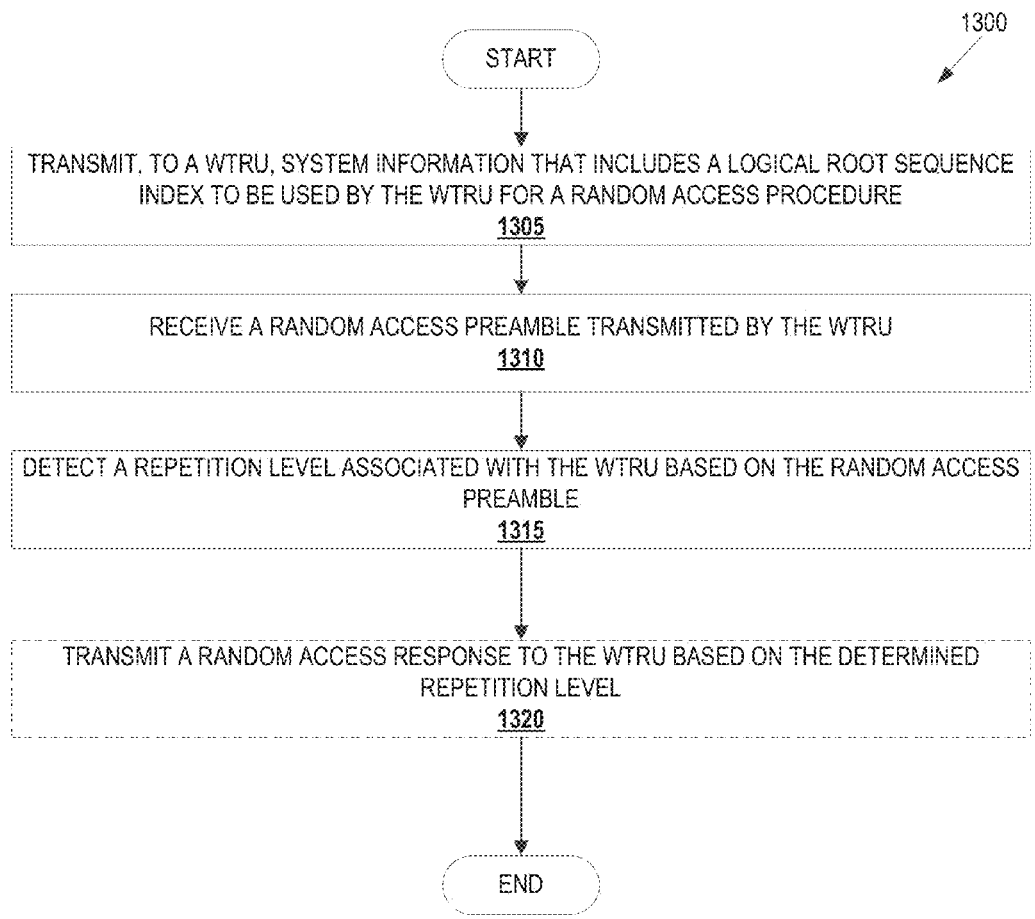
FIG. 13 is a flow diagram illustrating a method for determining a group associated with random access preambles based on a repetition level, in accordance with various embodiments.

With respect to FIG. 13, a flow diagram illustrates a method 1300 for determining a group associated with random access preambles based on a repetition level, in accordance with various embodiments. The method 1300 may be performed by an access node, such as one of the access node 105 of FIG. 1. While FIG. 13 illustrates a plurality of sequential operations, one of ordinary skill would understand that one or more operations of the method 1300 may be transposed and/or performed contemporaneously.

The method 1300 may begin with an operation 1305 for transmitting, to a WTRU, system information (e.g., one or more SIBs) that includes a logical root sequence index to be used by the WTRU for a random access procedure. The system information may be transmitted as a broadcast to a plurality of WTRUs that operate on a cell. The logical root sequence index may be used at the WTRU to identify a physical root sequence index to generate a plurality of random access preambles for a cell. According to an embodiment, the system information (e.g., a SIB) may include an indication of at least two logical root sequence indices—one to be used for WTRUs associated with a repetition level of one and another to be used for WTRUs associated with a repetition level greater than one.

Operation 1310 may include receiving a random access preamble transmitted by the WTRU. Based on the received random access preamble, operation 1315 may include detecting a repetition level associated with the transmitting WTRU. The repetition level may be associated with a number of times data is communicated in a channel between an access node and the transmitting WTRU. For example, if a random access preamble is associated with a first group of sixty-four random access preambles available in a cell, then an access node may determine that one repetition of data is sufficient—e.g., a repetition level of one may be associated with legacy WTRUs, non-MTC WTRUs, and/or non-coverage-limited WTRUs. Similarly, if a random access preamble is associated with a second group that is beyond the first group of sixty-four random access preambles, then an access node may determine that additional repetitions of data may benefit the transmitting WTRU, which may be MTC-adapted and/or have limited coverage. In some embodiments, the repetition level may be detected based on both a group associated with the random access preamble and a resource opportunity (e.g., a time, frequency, and/or code resource) used by the WTRU for transmission of the random access preamble. In response to the received random access preamble, the method 1300 may include an operation 1320 for transmitting a random access response to the WTRU. In some embodiments, the random access response may be repeated based on the detected repetition level.

Figure 14:
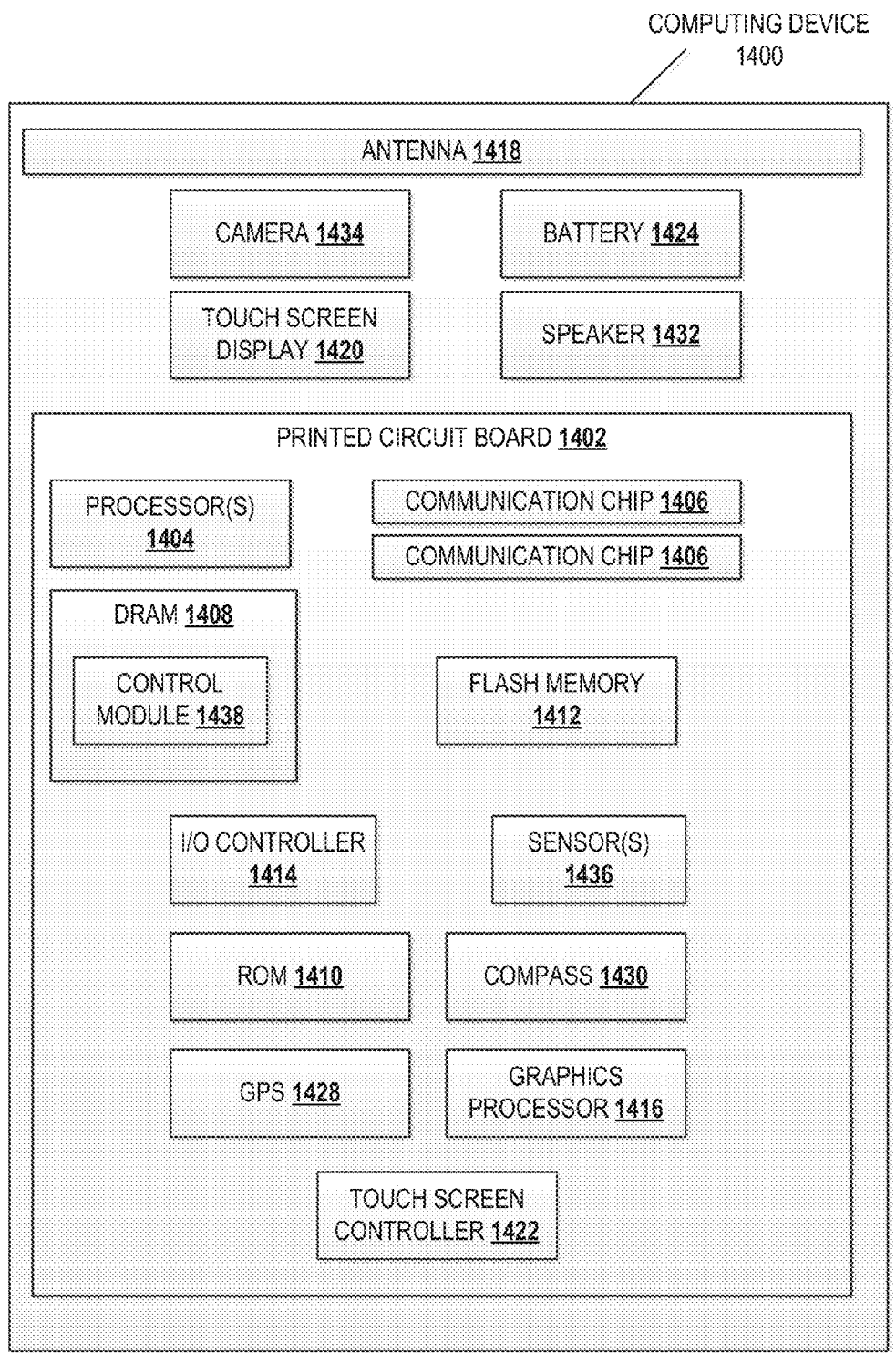
FIG. 14 is a block diagram illustrating a computing device adapted to operate in a wireless communication network, in accordance with various embodiments.

Now with reference to FIG. 14, a block diagram illustrates an example computing device 1400, in accordance with various embodiments. The access node 105 and/or the WTRUs 120, 125 of FIG. 1 and described herein may be implemented on a computing device such as computing device 1400. Further, the computing device 1400 may be adapted to perform one or more operations of the method 1000 described with respect to FIG. 10, the method 1100 described with respect to FIG. 11, the method 1200 described with respect to FIG. 12, and/or the method 1300 described with respect to FIG. 13. The computing device 1400 may include a number of components, one or more processors 1404, and one or more communication chips 1406. Depending upon the embodiment, one or more of the enumerated components may comprise "circuitry" of the computing device 1400, such as processing circuitry, communication circuitry, and the like. In various embodiments, the one or more processor(s) 1404 each may be a processor core. In various embodiments, the one or more communication chips 1406 may be physically and electrically coupled with the one or more processor(s) 1404. In further implementations, the communication chips 1406 may be part of the one or more processor(s) 1404. In various embodiments, the computing device 1400 may include a printed circuit board ("PCB") 1402. For these embodiments, the one or more processor(s) 1404 and communication chip 1406 may be disposed thereon. In alternate embodiments, the various components may be coupled without the employment of the PCB 1402.

Depending upon its applications, the computing device 1400 may include other components that may or may not be physically and electrically coupled with the PCB 1402. These other components include, but are not limited to, volatile memory (e.g., dynamic random access memory 1408, also referred to as "DRAM"), non-volatile memory (e.g., read only memory 1410, also referred to as "ROM"), flash memory 1412, an input/output controller 1414, a digital signal processor (not shown), a crypto processor (not shown), a graphics processor 1416, one or more antenna(s) 1418, a display (not shown), a touch screen display 1420, a touch screen controller 1422, a battery 1424, an audio codec (not shown), a video code (not shown), a global navigation satellite system 1428, a compass 1430, an accelerometer (not shown), a gyroscope (not shown), a speaker 1432, a camera 1434, one or more sensors 1436 (e.g., a barometer, Geiger counter, thermometer, viscometer, rheometer, altimeter, or other sensor that may be found in various manufacturing environments or used in other applications), a mass storage device (e.g., a hard disk drive, a solid state drive, compact disk and drive, digital versatile disk and drive, etc.) (not shown), and the like. In various embodiments, the one or more processor(s) 1404 may be integrated on the same die with other components to form a system on a chip ("SOC").

In various embodiments, volatile memory (e.g., DRAM 1408), non-volatile memory (e.g., ROM 1410), flash memory 1412, and the mass storage device (not shown) may include programming instructions configured to enable the computing device 1400, in response to the execution by one or more processor(s) 1404, to practice all or selected aspects of the data exchanges and methods described herein, depending on the embodiment of the computing device 1400 used to implement such data exchanges and methods. More specifically, one or more of the memory components (e.g., DRAM 1408, ROM 1410, flash memory 1412, and the mass storage device) may include temporal and/or persistent copies of instructions that, when executed by one or more processor(s) 1404, enable the computing device 1400 to operate one or more modules 1438 configured to practice all or selected aspects of the data exchanges and method described herein, depending on the embodiment of the computing device 1400 used to implement such data exchanges and methods.

The communication chips 1406 may enable wired and/or wireless communication for the transfer of data to and from the computing device 1400. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 1406 may implement any of a number of wireless standards or protocols, including but not limited to LTE, LTE-A, Institute of Electrical and Electronics Engineers ("IEEE") 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data Rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as other wireless protocols that are designated as 3G, 4G, 5G, and beyond. The computing device 1400 may include a plurality of communication chips 1406 adapted to perform different communication functions. For example, a first communication chip 1406 may be dedicated to shorter range wireless communications, such as Wi-Fi and Bluetooth, whereas a second communication chip 1406 may be dedicated to longer range wireless communications, such as GPS, EDGE, GPRS, CDMA, WiMAX, LTE, LTE-A, Ev-DO, and the like.

Figure 15:
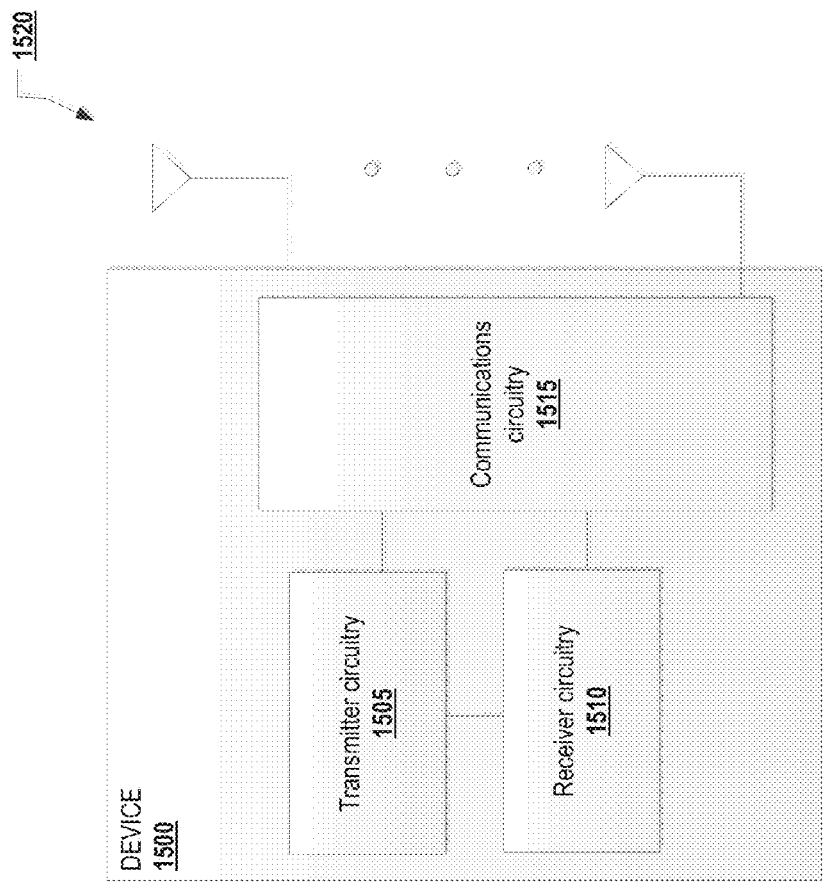
FIG. 15 is a block diagram illustrating a transmitting device, in accordance with various embodiments.

FIG. 15 illustrates a device 1500 in accordance with some embodiments. The device 1500 may be similar to and/or included in the access node 105 and/or the WTRUs 120, 125 of FIG. 1. The device 1500 may include transmitter circuitry 1505, receiver circuitry 1510, communications circuitry 1515, and one or more antennas 1520 coupled with each other at least as shown.

Briefly, the communications circuitry 1515 may be coupled with the antennas 1520 to facilitate over-the-air communication of signals to/from the device 1500. Operations of the communications circuitry 1515 may include, but are not limited to, filtering, amplifying, storing, modulating, demodulating, transforming, etc.

The transmitter circuitry 1505 may be coupled with the communications circuitry 1515 and may be configured to provide signals to the communications circuitry 1515 for transmission by the antennas 1520. In various embodiments, the transmitter circuitry 1505 may be configured to provide various signal processing operations on the signal to provide the signal to the communications circuitry 1515 with appropriate characteristics. In some embodiments, the transmitter circuitry 1505 may be adapted to generate signals. Further, the transmitter circuitry 1505 may be adapted to scramble, multiplex, and/or modulate various signals prior to transmission by the communications circuitry 1515.

The receiver circuitry 1510 may be coupled with the communications circuitry 1515 and may be configured to receive signals from the communications circuitry 1515. In some embodiments, the receiver circuitry 1510 may be adapted to generate signals. Further, the receiver circuitry 1510 may be adapted to descramble, de-multiplex, and/or demodulate various signals following reception by the communications circuitry 1515.

Some or all of the communications circuitry 1515, transmitter circuitry 1505, and/or receiver circuitry 1510 may be included in, for example, a communication chip and/or communicatively coupled with a printed circuit board as described with respect to FIG. 14.

In various embodiments, example 1 may be an apparatus to be included in a wireless transmit and receive unit ("WTRU"), the apparatus comprising: processing circuitry to determine a repetition level that corresponds to a number of repetitions associated with wireless communications to or from the WTRU, to determine a resource associated with the repetition level for a random access procedure based on the determined repetition level, and to generate a random access preamble; and communications circuitry, communicatively coupled with the processing circuitry, to transmit the generated random access preamble to an access node using a physical random access channel associated with the random access procedure based on the determined resource. Example 2 may be the apparatus of example 1, wherein the WTRU is adapted for machine-type communication. Example 3 may be the apparatus of example 1, wherein the processing circuitry is to determine the repetition level based on an estimated path loss associated with communication with the access node. Example 4 may be the apparatus of any of examples 1-3, wherein the resource is a time resource, a frequency resource, or a code resource associated with a random access opportunity with the access node. Example 5 may be the apparatus of example 4, wherein the resource is a code resource that comprises a root sequence index and a cyclic shift. Example 6 may be the apparatus of any of examples 1-3, wherein the processing circuitry is to generate the random access preamble using a logical root sequence index that is determined based on a cubic metric value, the cubic metric value to indicate whether the WTRU is associated with limited coverage.

In various embodiments, example 7 may be an apparatus to be included in a wireless transmit and receive unit ("WTRU"), the apparatus comprising: processing circuitry to determine a repetition level associated with wireless communication by the WTRU, to generate a plurality of random access preambles, to determine a group associated with random access preambles based on the determined repetition level, and to determine a random access preamble from the generated random access preambles based on the determined group; and communications circuitry, communicatively coupled with the processing circuitry, to transmit the determined random access preamble to an access node using a physical random access channel. Example 8 may be the apparatus of example 7, wherein the WTRU is adapted for machine-type communication. Example 9 may be the apparatus of any of examples 7-8, wherein the communications circuitry is to receive a system information block from the access node, and further wherein the processing circuitry is to determine a logical root index from the system information block based on the determined repetition level, determine a physical root index corresponding to the determined logical root index, and generate the plurality of random access preambles based on the determined physical root index. Example 10 may be the apparatus of any of examples 7-8, wherein to determine the group associated with random access preambles based on the determined repetition level comprises to: estimate path loss between the WTRU and the access node; calculate a value based on subtraction of (1) a power offset between a random access preamble and a message scheduled for uplink transmission and (2) a preamble initial received target power from a maximum output power of a cell provided by the access node; determine the group based on comparison of the estimated path loss to a difference between the calculated value and a power offset associated with the group. Example 11 may be the apparatus of example 10, wherein the power offset associated with the group is included in a system information block, and further wherein the communications circuitry is to receive the system information block from the access node. Example 12 may be the apparatus of any of examples 7-8, wherein the repetition level is greater than one, and further wherein the determined group is associated with at least one logical root sequence index that is also associated with another group that corresponds to a repetition level of one. Example 13 may be the apparatus of any of examples 7-8, wherein the processing circuitry is to determine a resource associated with a random access procedure based on the repetition level, and further wherein the communications circuitry is to transmit the determined random access preamble based on the determined resource. Example 14 may be the apparatus of any of examples 7-8, wherein the processing circuitry is to generate the random access preamble using a logical root sequence index that is determined based on a cubic metric value, the cubic metric value to indicate whether the WTRU is associated with limited coverage.

In various embodiments, example 15 may be an apparatus to be included in an access node, the apparatus comprising: communications circuitry that is to transmit, to a wireless transmit and receive unit ("WTRU"), system information that includes an indication of a resource to be used by the WTRU for a random access procedure, and to receive a random access preamble transmitted by the WTRU; and processing circuitry, communicatively coupled with the communications circuitry, to detect a repetition level associated with the WTRU based on a resource used by the WTRU for the transmission of the random access preamble. Example 16 may be the apparatus of example 15, wherein the communications circuitry is further to transmit a random access response to the WTRU based on the detected repetition level. Example 17 may be the apparatus of example 15, wherein the indication of the resource is to be used where the WTRU is associated with a repetition level greater than one, and further wherein the system information is to include another indication of a resource to be used where the WTRU is associated with a repetition level of one. Example 18 may be the apparatus of any of examples 15-17, wherein the resource is a time resource, a frequency resource, or a code resource associated with a random access opportunity with the access node. Example 19 may be the apparatus of example 18, wherein the code resource comprises a root sequence index and a cyclic shift. Example 20 may be the apparatus of any of examples 15-17, wherein the system information is further to include a logical root sequence index that is based on a cubic metric value associated with communication with the WTRU.

In various embodiments, example 21 may be an apparatus to be included in an access node, the apparatus comprising: communications circuitry that is to transmit, to a wireless transmit and receive unit ("WTRU"), system information that includes a logical root sequence index to be used by the WTRU for a random access procedure, and to receive a random access preamble transmitted by the WTRU; and processing circuitry, communicatively coupled with the communications circuitry, to detect a repetition level associated with the WTRU based on the random access preamble. Example 22 may be the apparatus of example 21, wherein the logical root sequence index is indicated in the system information to be used where the WTRU is associated with a repetition level greater than one, and further wherein the system information is to include another logical root sequence index that is indicated to be used where the WTRU is associated with a repetition level of one. Example 23 may be the apparatus of any of examples 21-22, wherein the system information is to include an indication of a group of random access preambles to be used where the WTRU is associated with a repetition level greater than one. Example 24 may be the apparatus of example 23, wherein the system information is to include an indication of a resource to be used wherein the WTRU is associated with a repetition level greater than one, and the processing circuitry is to detect the repetition level further based on a resource associated with the random access preamble transmitted by the WTRU. Example 25 may be the apparatus of any of examples 21-22, wherein the logical root sequence index is based on a cubic metric value associated with communication with the WTRU.

In various embodiments, example 26 may be a method to be performed by a wireless transmit and receive unit ("WTRU"), the method comprising: determining a repetition level that corresponds to a number of repetitions associated with wireless communications to or from the WTRU; determining a resource associated with the repetition level for a random access procedure based on the determined repetition level; generating a random access preamble; and transmitting the generated random access preamble to an access node using a physical random access channel associated with the random access procedure based on the determined resource. Example 27 may be the method of example 26, wherein the WTRU is adapted for machine-type communication. Example 28 may be the method of any of examples 26-27, wherein the determining the repetition level is based on an estimated path loss associated with communication with the access node. Example 29 may be the method of any of examples 26-27, wherein the resource is a time resource, a frequency resource, or a code resource associated with a random access opportunity with the access node.

In various embodiments, example 30 may be one or more non-transitory computer system-readable media comprising computing device-executable instructions, wherein the instructions, in response to execution by a wireless transmit and receive unit ("WTRU"), cause the WTRU to: determine a repetition level associated with wireless communication by the WTRU; generate a plurality of random access preambles; determine a group associated with random access preambles based on the determined repetition level; determine a random access preamble from the generated random access preambles based on the determined group; and transmit the determined random access preamble to an access node using a physical random access channel. Example 31 may be the one or more non-transitory computer system-readable media of example 30, wherein the WTRU is adapted for machine-type communication. Example 32 may be the one or more non-transitory computer system-readable media of any of examples 30-31, wherein the instructions further cause the WTRU to: process a system information block that is to be received from the access node; determine a logical root index from the system information block based on the determined repetition level; determine a physical root index corresponding to the determined logical root index; and generate the plurality of random access preambles based on the determined physical root index. Example 33 may be the one or more non-transitory computer system-readable media of any of examples 30-31, wherein to determine the group associated with random access preambles based on the determined repetition level comprises to: estimate path loss between the WTRU and the access node; calculate a value based on subtraction of (1) a power offset between a random access preamble and a message scheduled for uplink transmission and (2) a preamble initial received target power from a maximum output power of a cell provided by the access node; determine the group based on comparison of the estimated path loss to a difference between the calculated value and a power offset associated with the group. Example 34 may be the one or more non-transitory computer system-readable media of example 33, wherein the power offset associated with the group is included in a system information block that is to be received from the access node.

In various embodiments, example 35 may be a method to be performed by an access node, the method comprising: transmitting, to a wireless transmit and receive unit ("WTRU"), system information that includes an indication of a resource to be used by the WTRU for a random access procedure; receiving a random access preamble transmitted by the WTRU; detecting a repetition level associated with the WTRU based on a resource used by the WTRU for the transmission of the random access preamble. Example 36 may be the method of example 35, further comprising: transmitting a random access response to the WTRU based on the detected repetition level. Example 37 may be the method of any of examples 35-36, wherein the indication of the resource is to be used where the WTRU is associated with a repetition level greater than one, and further wherein the system information is to include another indication of a resource to be used where the WTRU is associated with a repetition level of one. Example 38 may be the method of any of examples 35-36, wherein the resource is a time resource, a frequency resource, or a code resource associated with a random access opportunity with the access node.

In various embodiments, example 39 may be one or more non-transitory computer system-readable media comprising computing device-executable instructions, wherein the instructions, in response to execution by an access node, cause the access node to: transmit, to a wireless transmit and receive unit ("WTRU"), system information that includes a logical root sequence index to be used by the WTRU for a random access procedure; process a random access preamble transmitted by the WTRU; and detect a repetition level associated with the WTRU based on the random access preamble. Example 40 may be the one or more non-transitory computer system-readable media of example 39, wherein the logical root sequence index is indicated in the system information to be used where the WTRU is associated with a repetition level greater than one, and further wherein the system information is to include another logical root sequence index that is indicated to be used where the WTRU is associated with a repetition level of one.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An apparatus to be included in a wireless transmit and receive unit ("WTRU"), the apparatus comprising:
   processing circuitry to:
      determine a repetition level that corresponds to a number of repetitions associated with wireless communications between the WTRU and an access node;
      generate a random access preamble based on a logical root sequence index associated with the determined repetition level; and
      determine a resource of a physical random access channel (PRACH) for transmission of random access preambles associated with a repetition level equal to the determined repetition level, the resource determined from a first PRACH resource for transmission of random access preambles associated with a first repetition level and a second PRACH resource for transmission of random access preambles associated with a second repetition level, the first PRACH resource different than the second PRACH resource; and
   communications circuitry, communicatively coupled with the processing circuitry, to transmit the generated random access preamble to the access node using the determined resource of the PRACH.

2. The apparatus of claim 1, wherein the WTRU is adapted for machine-type communication.

3. The apparatus of claim 1, wherein the processing circuitry is to determine the repetition level based on an estimated path loss associated with the wireless communications between the WTRU and the access node.

4. The apparatus of claim 1, wherein the determined resource is a time resource, a frequency resource, or a code resource.

5. The apparatus of claim 4, wherein the determined resource is a code resource that comprises a root sequence index and a cyclic shift.

6. The apparatus of claim 1, wherein the logical root sequence index is determined based on a cubic metric value, the cubic metric value to indicate whether the WTRU is associated with limited coverage.

7. The apparatus of claim 1, wherein the first PRACH resource is a resource selected from a group consisting of a first time resource, a first frequency resource and a first code resource, and wherein the second PRACH resource is a resource selected from a group consisting of a second time resource, a second frequency resource and a second code resource.

8. An apparatus to be included in a wireless transmit and receive unit ("WTRU"), the apparatus comprising:
  processing circuitry to:
    generate a plurality of random access preambles for transmissions of messages from the WTRU based on a first logical root sequence index associated with a first repetition level, the first logical root sequence index different than a second logical root sequence index associated with a second repetition level used to generate a second plurality of random access preambles;
    estimate a path loss between the WTRU and an access node;
    determine a difference between a maximum output power of a cell provided by the access node and a sum of (1) a power offset between a random access preamble and a message scheduled for uplink transmission and (2) a preamble initial received target power;
    compare the path loss with the determined difference;
    determine a group of random access preambles from the plurality of random access preambles available for transmission in association with the message based on the comparison of the path loss with the determined difference;
    identify a random access preamble within the determined group; and
    determine a physical random access channel (PRACH) resource associated with the determined group from PRACH resources; and
  communications circuitry, communicatively coupled with the processing circuitry, to transmit the identified random access preamble to the access node using the PRACH resource associated with the determined group.

9. The apparatus of claim 8, wherein the WTRU is adapted for machine-type communication.

10. The apparatus of claim 8, wherein:
  the communications circuitry is to receive a system information block, that includes the first logical root sequence index, from the access node; and
  the processing circuitry is further to identify a physical root sequence corresponding to the first logical root sequence index included in the system information block, wherein the plurality of random access preambles is generated by application of cyclic shifts to a Zadoff-Chu sequence corresponding to the physical root sequence.

11. The apparatus of claim 10, wherein the first logical root sequence index corresponds to a cubic metric value that indicates coverage of the cell provided by the access node.

12. The apparatus of claim 8, wherein the communications circuitry is further to receive a system information block from the access node, wherein the system information block includes one or more message power offset values corresponding to one or more groups of random access preambles from the plurality of random access preambles, and wherein the determination of the group of random access preambles includes selection of the group from the one or more groups of random access preambles based on the one or more message power offset values.

13. The apparatus of claim 8, wherein the processing circuitry is further to determine an available subframe of the PRACH based on one or more of physical layer timing requirements, a PRACH mask index and a PRACH configuration index, and wherein the transmission of the identified random access preamble is within the available subframe of the PRACH.

14. An apparatus to be included in an access node, the apparatus comprising:
  communications circuitry to:
    transmit, to a wireless transmit and receive unit ("WTRU"), a system information block that includes an indication of one or more resources of a physical random access channel (PRACH) for transmission of messages from the WTRU to the access node and a logical root sequence index for generation of a plurality of random access preambles associated with at least one repetition level, wherein each of the one or more resources correspond to a repetition level associated with transmissions to the access node; and
    receive a random access preamble transmitted by the WTRU on a resource of the PRACH; and
  processing circuitry, communicatively coupled with the communications circuitry, to:
    detect the resource used by the WTRU for the transmission of the random access preamble;
    compare the resource used by the WTRU with a plurality of different resources associated with different repetition levels; and
    determine a repetition level of the WTRU based on the comparison.

15. The apparatus of claim 14, wherein the communications circuitry is further to transmit a random access response to the WTRU a number of times corresponding to the determined repetition level.

16. The apparatus of claim 14, wherein the indication includes an identification of a first portion of the one or more resources that are associated with a repetition level greater than one, and an identification of a second portion of the one or more resources that are associated with a repetition level of one.

17. The apparatus of claim 14, wherein the resource used by the WTRU is a time resource, a frequency resource, or a code resource.

18. The apparatus of claim 17, wherein the code resource comprises a root sequence index and a cyclic shift.

19. The apparatus of claim 14, wherein the system information block includes the logical root sequence index that is based on a cubic metric value associated with communication with the WTRU.

20. An apparatus to be included in an access node, the apparatus comprising:
communications circuitry to:
transmit, to a wireless transmit and receive unit ("WTRU"), a system information block that includes a logical root sequence index associated with at least one repetition level to be used by the WTRU for generation of a plurality of random access preambles; and
receive a random access preamble, from the plurality of random access preambles, transmitted from the WTRU on a physical random access channel (PRACH) resource; and
processing circuitry, communicatively coupled with the communications circuitry, to determine a repetition level associated with the WTRU based on the random access preamble and the PRACH resource on which the random access preamble was transmitted.

21. The apparatus of claim 20, wherein the logical root sequence index is indicated in the system information block to be used where the WTRU is associated with a repetition level greater than one, and further wherein the system information block is to include another logical root sequence index that is indicated to be used where the WTRU is associated with a repetition level of one.

22. The apparatus of claim 20, wherein the system information block includes an indication of a group of random access preambles to be used where the WTRU is associated with a repetition level greater than one.

23. The apparatus of claim 22, wherein the system information block includes an indication of a resource to be used where the WTRU is associated with a repetition level greater than one, and the determination of the repetition level is further based on a resource associated with the random access preamble transmitted by the WTRU.

24. The apparatus of claim 20, wherein the logical root sequence index is based on a cubic metric value associated with communication with the WTRU.

* * * * *